(12) United States Patent
Jung

(10) Patent No.: US 12,229,434 B2
(45) Date of Patent: Feb. 18, 2025

(54) OPERATION METHOD OF HOST DEVICE AND OPERATION METHOD OF STORAGE DEVICE FOR MIGRATION OF DATA

(71) Applicant: Samsung Electronics Co., Ltd., Suwon-si (KR)

(72) Inventor: Jaehwan Jung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 49 days.

(21) Appl. No.: 18/188,882

(22) Filed: Mar. 23, 2023

(65) Prior Publication Data
US 2023/0325110 A1 Oct. 12, 2023

(30) Foreign Application Priority Data

Apr. 7, 2022 (KR) .................. 10-2022-0043456
Jun. 16, 2022 (KR) .................. 10-2022-0073186

(51) Int. Cl.
*G06F 3/06* (2006.01)

(52) U.S. Cl.
CPC .......... *G06F 3/0655* (2013.01); *G06F 3/0604* (2013.01); *G06F 3/0647* (2013.01); *G06F 3/0679* (2013.01)

(58) Field of Classification Search
CPC .... G06F 3/0655; G06F 3/0604; G06F 3/0687; G06F 3/0679
See application file for complete search history.

(56) References Cited

U.S. PATENT DOCUMENTS

| | | | |
|---|---|---|---|
| 6,141,743 A * | 10/2000 | Strongin | G06F 13/4217 710/3 |
| 9,003,103 B2 | 4/2015 | Paleologu et al. | |
| 10,318,365 B2 | 6/2019 | Li et al. | |
| 10,824,375 B1 | 11/2020 | Natanzon et al. | |
| 11,074,092 B2 | 7/2021 | Dong et al. | |
| 11,620,233 B1 * | 4/2023 | Habusha | G06F 12/0891 711/207 |
| 2011/0066819 A1 | 3/2011 | Mashtizadeh et al. | |
| 2020/0125384 A1 | 4/2020 | Serebrin et al. | |
| 2021/0157736 A1 | 5/2021 | Bavishi et al. | |
| 2021/0406201 A1 | 12/2021 | Rozas et al. | |
| 2023/0251799 A1* | 8/2023 | Lee | G06F 3/0604 711/154 |

FOREIGN PATENT DOCUMENTS

| | | |
|---|---|---|
| CN | 105938457 A | 9/2016 |
| KR | 10-1921365 B1 | 11/2018 |

* cited by examiner

*Primary Examiner* — Gurtej Bansal
(74) *Attorney, Agent, or Firm* — Harness, Dickey & Pierce, P.L.C.

(57) ABSTRACT

An operation method of a host device configured to control a storage device includes receiving initial mapping information from the storage device, performing initial migration based on the initial mapping information such that source data present in a first region of the storage device migrate to a second region, receiving first dirty information about first dirty data of the source data from the storage device, performing first migration on the first dirty data based on the first dirty information, receiving second dirty information about second dirty data of the source data from the storage device, and performing second migration on the second dirty data based on the second dirty information, and a size of the first dirty information is different from a size of the second dirty information.

20 Claims, 18 Drawing Sheets

FIG. 7

OPERATION METHOD OF HOST DEVICE AND OPERATION METHOD OF STORAGE DEVICE FOR MIGRATION OF DATA

CROSS-REFERENCE TO RELATED APPLICATIONS

This application claims priority under 35 U.S.C. § 119 to Korean Patent Application Nos. 10-2022-0043456 filed on Apr. 7, 2022, and 10-2022-0073186 filed on Jun. 16, 2022, in the Korean Intellectual Property Office, the disclosures of which are incorporated by reference herein in their entireties.

BACKGROUND

Some example embodiments of the inventive concepts described herein relate to a computer system, and more particularly, relate to an operation method of a host device and an operation method of a storage device.

A computer system is configured to perform various calculations or to drive various programs, by using data stored in a storage device. In the computer system, for efficient data management, data stored in the storage device may be copied or may migrate to any other region of the storage device or to any other storage device. As an example, the migration of a virtual machine that is driven on the computer system is used to replicate a virtual machine of a physical server to any other physical server for the purpose of server consolidation and system recovery.

In general, during the migration of the virtual machine, because data should not be changed (or modified) due to the operation of the virtual machine, the migration may be performed in a state where the operation of the virtual machine is suspended. In contrast, the recent live migration supports the migration of the virtual machine without suspending the virtual machine. In this case, during the migration, there is a need to make data (e.g., dirty data) changed due to the operation of the virtual machine up-to-date.

SUMMARY

Some example embodiments of the inventive concepts provide an operation method of a host device with improved performance and an operation method of a storage device.

According to some example embodiments, an operation method of a host device configured to control a storage device includes receiving initial mapping information from the storage device, performing initial migration based on the initial mapping information such that source data present in a first region of the storage device migrate to a second region, receiving first dirty information about first dirty data of the source data from the storage device, performing first migration on the first dirty data based on the first dirty information, receiving second dirty information about second dirty data of the source data from the storage device, and performing second migration on the second dirty data based on the second dirty information, and a size of the first dirty information is different from a size of the second dirty information.

According to some example embodiments, an operation method of a storage device configured to operate under control of a host device includes sending initial mapping information about source data to the host device, performing initial migration under control of the host device such that the source data migrate from a first region to a second region, managing information about first dirty data generated from the source data by using a first bitmap while sending the initial mapping information and performing the initial migration, generating first dirty information based on the first bitmap and sending the first dirty information to the host device, performing first migration on the first dirty data under control of the host device, managing information about second dirty data generated from the source data by using a second bitmap while generating the first dirty information, sending the first dirty information, and performing the first migration, generating second dirty information based on the second bitmap and sending the second dirty information to the host device, and performing second migration on the second dirty data under control of the host device, and a size of the first dirty information is different from a size of the second dirty information.

According to some example embodiments, an operation method of a host device configured to control a storage device includes receiving initial mapping information from the storage device, performing initial migration based on the initial mapping information such that source data present in a first region of the storage device migrate to a second region, performing first migration on first dirty data of the source data, based on a first bitmap associated with the first dirty data of the source data, comparing the number of the first dirty data with a reference value, and performing second migration based on one of a second bitmap associated with second dirty data of the source data and second dirty information based on the second bitmap, depending on the comparison result. A size of the first bitmap is equal to a size of the second bitmap, and a size of the second dirty information is smaller than each, or one or more, of the size of the first bitmap and the size of the second bitmap.

BRIEF DESCRIPTION OF THE FIGURES

The above and other objects and features of the inventive concepts will become apparent by describing in detail some example embodiments thereof with reference to the accompanying drawings.

FIG. 7 is a diagram for describing an operation according to the flowchart of FIG. 6.

DETAILED DESCRIPTION

Below, some example embodiments of the inventive concepts will be described in detail and clearly to such an extent that an ordinary one in the art easily implements the inventive concepts.

Figure 1:
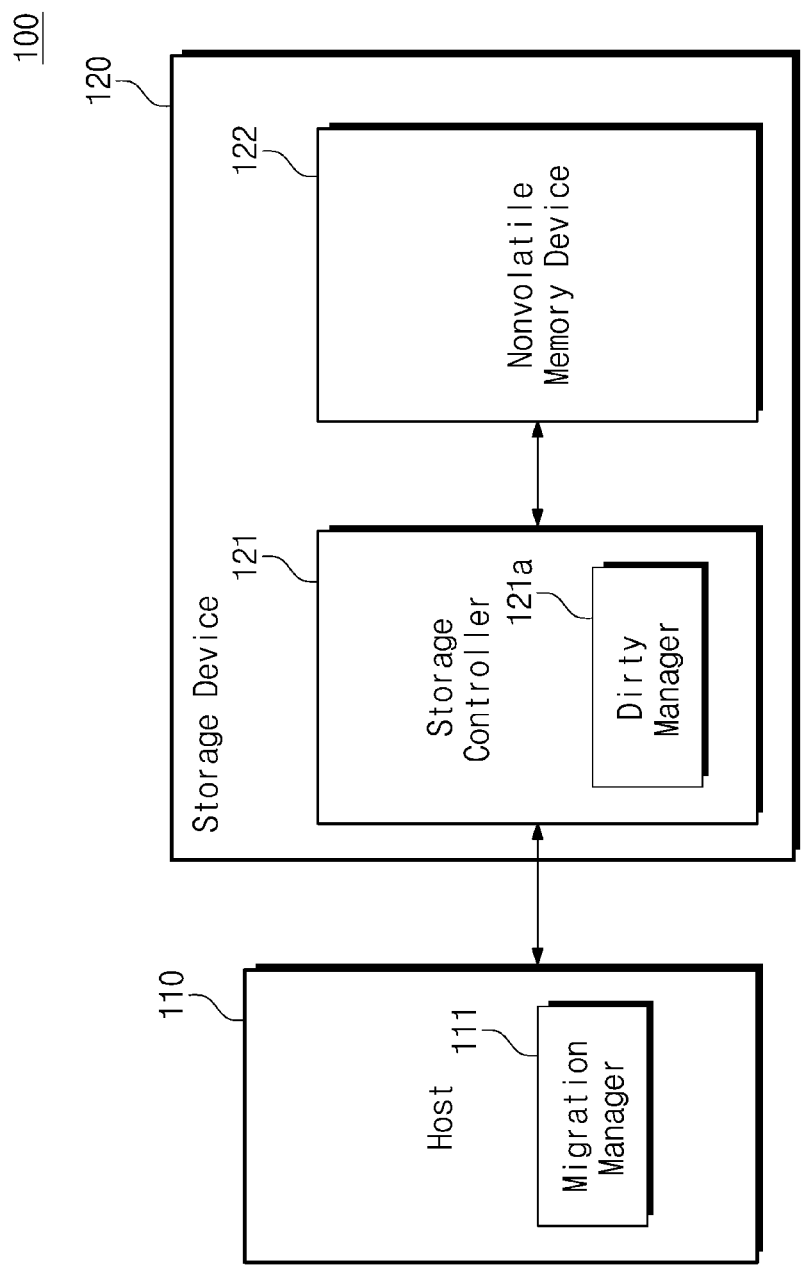
FIG. 1 is a block diagram illustrating a storage system according to some example embodiments of the inventive concepts.

FIG. 1 is a block diagram illustrating a storage system according to some example embodiments of the inventive concepts. Referring to FIG. 1, a storage system 100 may include a host device 110 and/or a storage device 120. In some example embodiments, the storage system 100 may be a computing system such as a computer, a notebook, a server, a workstation, a portable communication terminal, a personal digital assistant (PDA), a portable multimedia player (PMP), a smartphone, and/or a wearable device.

The host device 110 may store data in the storage device 120 or may read data stored in the storage device 120. For example, the host device 110 may send a write command and write data to the storage device 120 for the purpose of storing data in the storage device 120. Alternatively, to read data stored in the storage device 120, the host device 110 may send a read command to the storage device 120 and may receive data from the storage device 120. In some example embodiments, the host device 110 and the storage device 120 may communicate with each other based on a given interface. In some example embodiments, the given interface may support at least one of various interfaces such as a universal serial bus (USB) interface, a small computer system interface (SCSI), a peripheral component interconnection (PCI) express (PCIe) interface, an advanced technology attachment (ATA) interface, a parallel ATA (PATA) interface, a serial ATA (SATA) interface, a serial attached SCSI (SAS) interface, a universal flash storage)UFS) interface, a nonvolatile memory express (NVMe) interface, and/or a compute eXpress link (CXL) interface.

The storage device 120 may operate under control of the host device 110. For example, the storage device 120 may include a storage controller 121 and/or a nonvolatile memory device 122. The storage controller 121 may store the write data received from the host device 110 in the nonvolatile memory device 122 in response to the write command received from the host device 110. The storage controller 121 may send the data read from the nonvolatile memory device 122 to the host device 110 in response to the read command received from the host device 110.

In some example embodiments, the host device 110 may perform live migration. The live migration may refer to an operation of moving data associated with a first virtual machine driven on the host device 110 to a second virtual machine, without stopping driving the first virtual machine.

For example, the host device 110 may be configured to drive a plurality of virtual machines. The plurality of virtual machines may be driven on the host device 110 independently of each other, and data associated with the plurality of virtual machines may be stored in the storage device 120 for each, or one or more, virtual machine. In this case, the host device 110 may perform migration such that data associated with a first virtual machine (e.g., a source virtual machine) of the plurality of virtual machines are moved to a second virtual machine (e.g., a target virtual machine). In this case, the host device 110 may perform the above migration without stopping driving the first virtual machine.

In some example embodiments, when the operation of the first virtual machine (e.g., the source virtual machine) does not stop, data that are managed by the first virtual machine may be changed while the migration is performed (e.g., dirty data may be generated). In this case, the host device 110 may iteratively perform the above migration based on information about the dirty data until the number of dirty data is less than or equal to a threshold value TH. When the number of dirty data is less than or equal to the threshold value TH, the host device 110 may stop the operation of the first virtual machine and may perform migration such that final dirty data are moved to the second virtual machine. The host device 110 may complete the migration through the above process.

In some example embodiments, the host device 110 may include a migration manager 111. The migration manager 111 may be implemented in the form of hardware, software, or a combination thereof configured to manage the above live migration operation. The operation of the migration manager 111 will be more fully described with reference to the following drawings.

In some example embodiments, the storage controller 121 may include a dirty manager 121a. The dirty manager 121a may be configured to manage information about dirty data that are generated during the live migration. The operation of the dirty manager 121a will be more fully described with reference to the following drawings.

In some example embodiments, to check dirty data in the live migration, the host device 110 may request information about the dirty data from the storage device 120. In some example embodiments, the information about dirty data that are exchanged between the host device 110 and the storage device 120 may have variable granularity. In this case, compared to the case where the information about dirty data has fixed granularity, a time or latency necessary, or sufficient, to exchange the information about dirty data may decrease. Accordingly, the performance of the storage system 100 may be improved.

Figure 2:
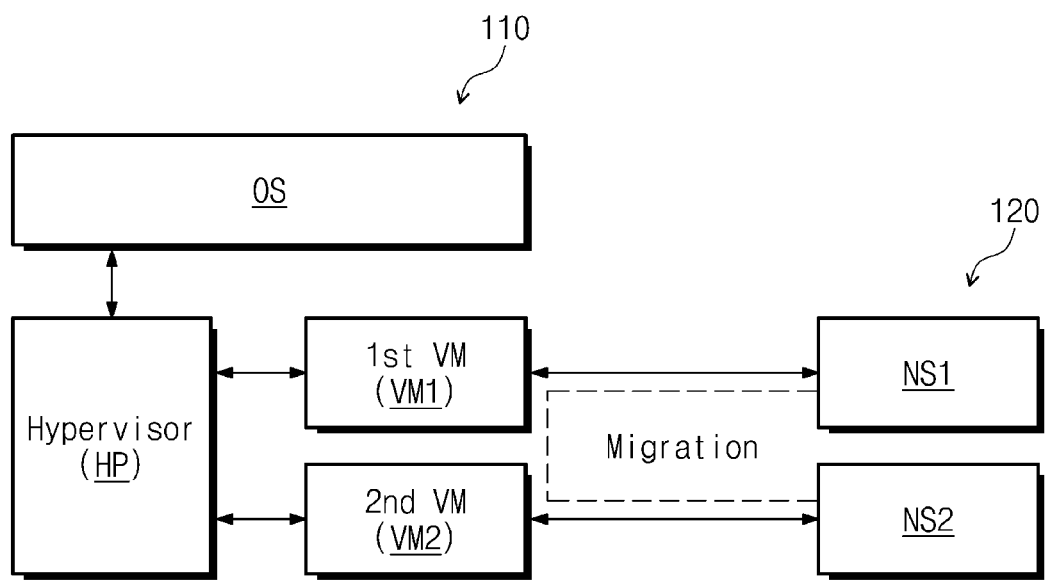
FIG. 2 is a diagram illustrating software layers of a storage system of FIG. 1.

FIG. 2 is a diagram illustrating software layers of a storage system of FIG. 1. Referring to FIG. 2, the storage system 100 may include the host device 110 and/or the storage device 120.

An operating system OS, a hypervisor HP, a first virtual machine VM1, and/or a second virtual machine VM2 may be driven on the host device 110. The operating system OS may be system software configured to control various hardware and/or resources included in the host device 110, to drive various programs, and/or to support various services. The hypervisor HP may be a logical platform configured to drive the first and/or second virtual machines VM1 and/or VM2 that are driven in the host device 110.

Each, or one or more, of the first and/or second virtual machines VM1 and/or VM2 may be driven in the host device 110. In some example embodiments, data associated with the first virtual machine VM1 may be stored in a first namespace NS1 of the storage device 120, and/or data associated with the second virtual machine VM2 may be stored in a second namespace NS2 of the storage device 120. Namespaces may refer to storage regions of the storage device 120, which are logically or physically classified. That is, the data that are managed by the first virtual machine VM1 may be logically or physically distinguished from the data that are managed by the second virtual machine VM2.

The hypervisor HP of the host device 110 may copy the data managed by the first virtual machine VM1 to the second namespace NS2 corresponding to the second virtual machine VM2. In this case, as described with reference to FIG. 1, the hypervisor HP may perform migration without stopping driving the first virtual machine VM1. Because the first virtual machine VM1 is driven during the migration, dirty data may be generated in the data managed by the first virtual machine VM1. The hypervisor HP may iteratively perform a migration operation based on information about dirty data such that dirty data of the data stored in the first namespace NS1 are moved (or copied) to the second namespace NS2. The above migration operation, that is, the live migration operation is provided only as an example, and the inventive concepts are not limited thereto.

In some example embodiments, while the migration operation is iteratively performed, the hypervisor HP may receive information (e.g., information about dirty data) for determining dirty data from the storage device 120. In this case, the information about dirty data may have the variable granularity. This will be described in detail with reference to the following drawings.

In some example embodiments, the hypervisor HP of FIG. 2 may include the migration manager 111 described with reference to FIG. 1. Alternatively, the hypervisor HP may be configured to perform the operation of the migration manager 111.

In some example embodiments, the migration for the virtual machine may be performed such that data migrate from a source to a target in the same storage device, from a source storage device to a target storage device, from a storage device of a source host device to a storage device of a target host device, and/or from a source system environment to a target system environment.

Figure 3:
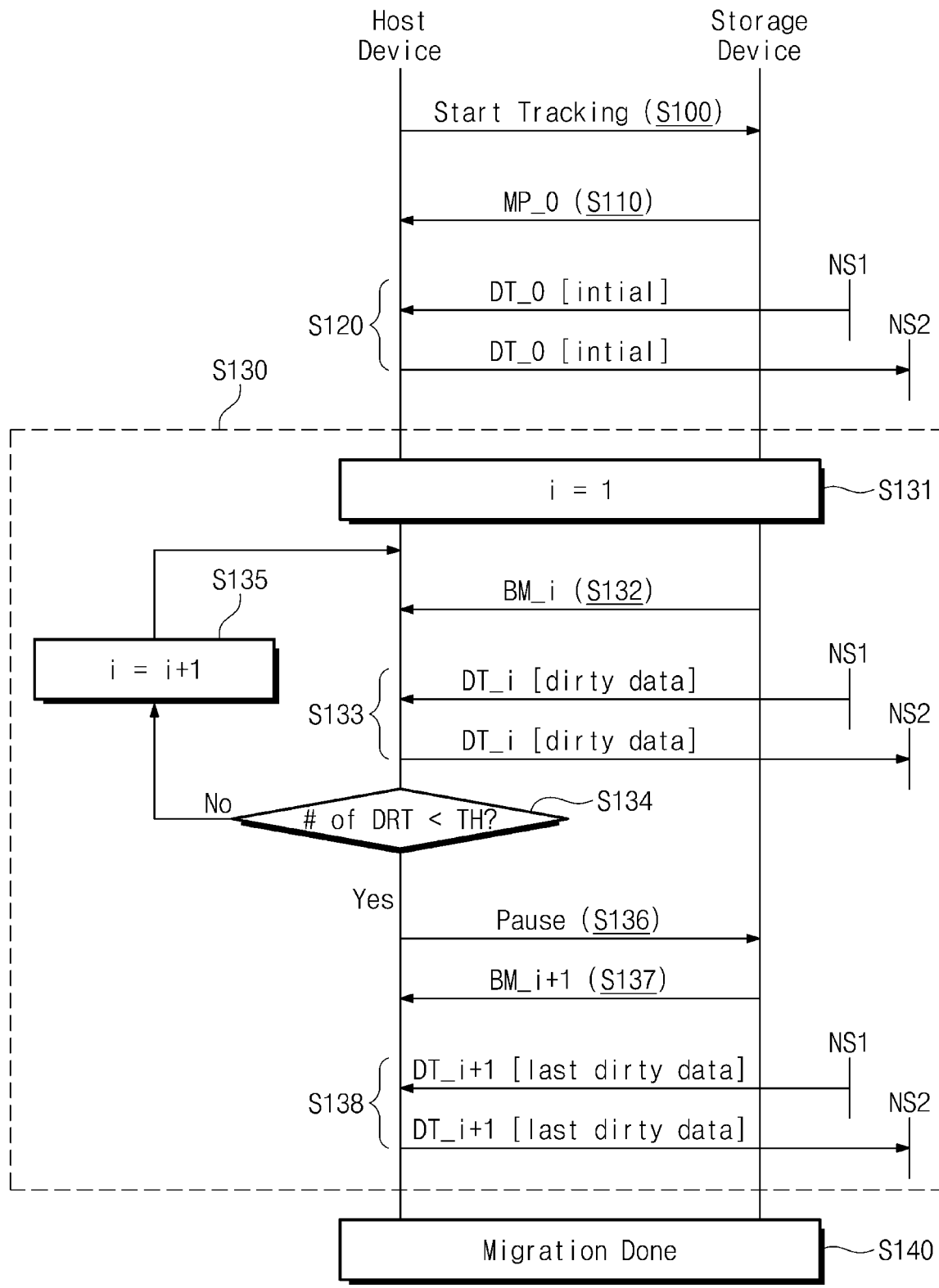
FIG. 3 is a flowchart for describing migration (or live migration) of a storage system of FIG. 1.

FIG. 3 is a flowchart for describing migration (e.g., live migration) of a storage system of FIG. 1. For convenience of description, it is assumed that the storage system 100 performs migration that data managed by the first virtual machine VM1 (e.g., the source virtual machine) are copied to the second virtual machine VM2 (e.g., the target virtual machine). That is, at least a portion of data stored in the first namespace NS1 (e.g., a source namespace and/or a source storage space) corresponding to the first virtual machine VM1 migrate to the second namespace NS2 (e.g., a target namespace and/or a target storage space) corresponding to the second virtual machine VM2. However, the inventive concepts are not limited thereto. A source virtual machine, a target virtual machine, a source namespace, a source storage space, a target namespace, and/or a target storage space may be variously changed depending on a way to implement. Alternatively, depending on the way to implement, in addition to data managed by a source virtual machine, all or one or more data or a program code necessary or sufficient to drive the source virtual machine may migrate to a target namespace or any other host device.

Referring to FIGS. 1 to 3, in operation S100, the host device 110 may send a tracking start request to the storage device 120. The tracking start request may refer to a request for tracking dirty data that are generated by the operation of the first virtual machine VM1 while the migration is performed. In some example embodiments, in response to the tracking start request received from the host device 110, the storage device 120 may manage dirty data, which are generated by the operation of the first virtual machine VM1, in the form of a bitmap.

In operation S110, the host device 110 may read initial mapping information MP_0 from the storage device 120. For example, the host device 110 may send, to the storage device 120, a command or a query request for reading the initial mapping information MP_0 from the storage device 120. The storage device 120 may send the initial mapping information MP_0 to the host device 110 in response to the command or the query request received from the host device 110. In some example embodiments, the initial mapping information MP_0 may indicate mapping information about the entire data (e.g., data targeted for migration) that are managed by the first virtual machine VM1 being the source virtual machine. That is, the host device 110 may determine data (hereinafter referred to as "source data") targeted for migration from the first namespace NS1 to the second namespace NS2, based on the initial mapping information MP_0.

In operation S120, under control of the host device 110, initial source data DT_0 stored in the first namespace NS1 of the storage device 120 may migrate to the second namespace NS2. For example, the host device 110 sends a read command for reading the initial source data DT_0 stored in the first namespace NS1 to the storage device 120. The storage device 120 sends the initial source data DT_0 stored in the first namespace NS1 to the host device 110 in response to the read command. The host device 110 sends, to the storage device 120, the initial source data DT_0 and a write command for storing the initial source data DT_0 in the second namespace NS2. The storage device 120 stores the initial source data DT_0 in the second namespace NS2 in response to the write command.

In some example embodiments, in the case where source data are present in the same storage device as a target namespace or a target storage space where the source data are to be stored or in the case where the source data are directly transferred between the source namespace (e.g., storage space) and/or the target namespace (e.g., storage space), the source data may migrate (e.g., may be swapped) within the storage device 120 without passing through the host device 110.

Through the above operation in operation S120, under control of the host device 110, the initial source data DT_0 may migrate from the first namespace NS1 to the second namespace NS2. In this case, while operation S120 is performed, because the first virtual machine VM1 is being driven, dirty data may be generated from the initial source data DT_0. That is, in operation S120, because the initial source data DT_0 to which the dirty data are not applied migrate to the second namespace NS2, the source data stored in the second namespace NS2 may not be up-to-date.

In operation S130, the host device 110 and/or the storage device 120 may iteratively perform the operation in which the dirty data migrate to the second namespace NS2. For example, operation S130 may include operation S131 to operation S138.

In operation S131, a variable "i" is set to "1". In some example embodiments, the variable "i" is for describing an iterative operation for applying dirty data and is not intended to have a specific technical meaning.

In operation S132, the host device 110 may receive an i-th bitmap BM_i from the storage device 120. For example, the host device 110 may send the command or the query request for reading the i-th bitmap BM_i to the storage device 120. The storage device 120 may send the i-th bitmap BM_i to the host device 110 in response to the command or the query request. In an embodiment, the i-th bitmap BM_i may include information about dirty data caused by the operation of the first virtual machine VM1 during the previous migration for source data.

In some example embodiments, in the case where the size of source data is 1 TB and the mapping unit between the source data and a bitmap is 8 KB, the size of the bitmap may be 128 Gbits (e.g., 16 GB). That is, a unit bit of the bitmap may express whether the dirty data is present in source data of a given size. The host device 110 may determine dirty data (e.g., the latest version of data) of the source data based on the i-th bitmap BM_i.

In operation S133, under control of the host device 110, i-th source data (e.g., dirty data) may migrate from the first namespace NS1 to the second namespace NS2. Operation S133 is similar to operation S120 except that not the entire source data but dirty data determined based on the i-th bitmap BM_i migrate, and thus, additional description will be omitted to avoid redundancy.

In operation S134, the host device 110 may determine whether the number of dirty data is less than the threshold value TH, based on the i-th bitmap BM_i. For example, the host device 110 may count the number of bits, each, or one or more, of which indicates dirty data, from among a plurality of bits included in the i-th bitmap BM_i. When the number of bits each, or one or more, indicating dirty data is greater than the threshold value TH, the host device 110 determines that the number of dirty data is greater than the threshold value TH. In this case, in operation S135, the variable "i" increases as much as "1". The host device 110 and the storage device 120 may iteratively perform operation S131 to operation S134, that is, operation S130.

In some example embodiments, while the above iterative operation is performed, the storage device 120 manages information about dirty data generated from the source data by using the bitmap BM_i. For example, during a time period from a point in time when a first bitmap BM_1 is transferred to a point in time when the migration of the source data (e.g., first dirty data) is completed, the storage device 120 manages information about second dirty data generated from the source data by using a second bitmap BM_2. Afterwards, during a time period from a point in time when the second bitmap BM_2 is transferred to a point in time when the migration of second source data (e.g., the second dirty data) is completed, the storage device 120 manages information about third dirty data generated from the source data by using a third bitmap BM_3.

In some example embodiments, as described above, as operation S130 is iteratively performed, the number of dirty data that are determined in each, or one or more, iteration operation may decrease. For example, in the first iteration operation, the first bitmap BM_1 may include information about the first dirty data generated during the migration of the initial source data DT_0. In the second iteration operation, the second bitmap BM_2 may include information about the second dirty data generated during the migration of the first dirty data in the first iteration operation. In this case, the size of the first dirty data is smaller than the size of the initial source data DT_0. That is, a time necessary, or sufficient, to perform migration in the first iteration operation is shorter than a time necessary, or sufficient, for the migration of the initial source data DT_0. That is, because the second dirty data are generated during a relatively short time compared to the first dirty data, the size of the second dirty data may be smaller than the size of the first dirty data.

According to the above description, as the migration of dirty data is iteratively performed, the size of dirty data that are generated in each, or one or more, iteration operation may decrease; after the iteration operation is performed as much as the given number of times, the number of dirty data may be less than the threshold value TH. In this case, in operation S136, the host device 110 may send a pause request to the storage device 120. In some example embodiments, the storage device 120 may pause or block the access to the first namespace NS1 in response to the pause request. That is, after the pause request, the operation/driving of the first virtual machine VM1 may be paused.

In operation S137, the host device 110 may receive an (i+1)-th bitmap BM_i+1 from the storage device 120. In an embodiment, the (i+1)-th bitmap BM_i+1 may include information about dirty data that are generated from a point in time when the previous bitmap (e.g., BM_i) is transferred to the host device 110 to a point in time when the pause request is transferred to the storage device 120. The remaining operations are similar to those in operation S132, and thus, additional description will be omitted to avoid redundancy.

In operation S138, under control of the host device 110, (i+1)-th source data (e.g., the last dirty data) may migrate from the first namespace NS1 to the second namespace NS2. Operation S138 is similar to operation S120 except that not the entire source data but dirty data determined based on the (i+1)-th bitmap BM_i+1 migrate, and thus, additional description will be omitted to avoid redundancy.

In operation S140, the host device 110 and/or the storage device 120 complete the migration. In some example embodiments, after the migration operation is completed, the host device 110 may access the up-to-date source data moved (e.g., copied) to the second namespace NS2 through the second virtual machine VM2. Alternatively, the host device 110 may access the up-to-date source data from the second namespace NS2.

Figure 4:
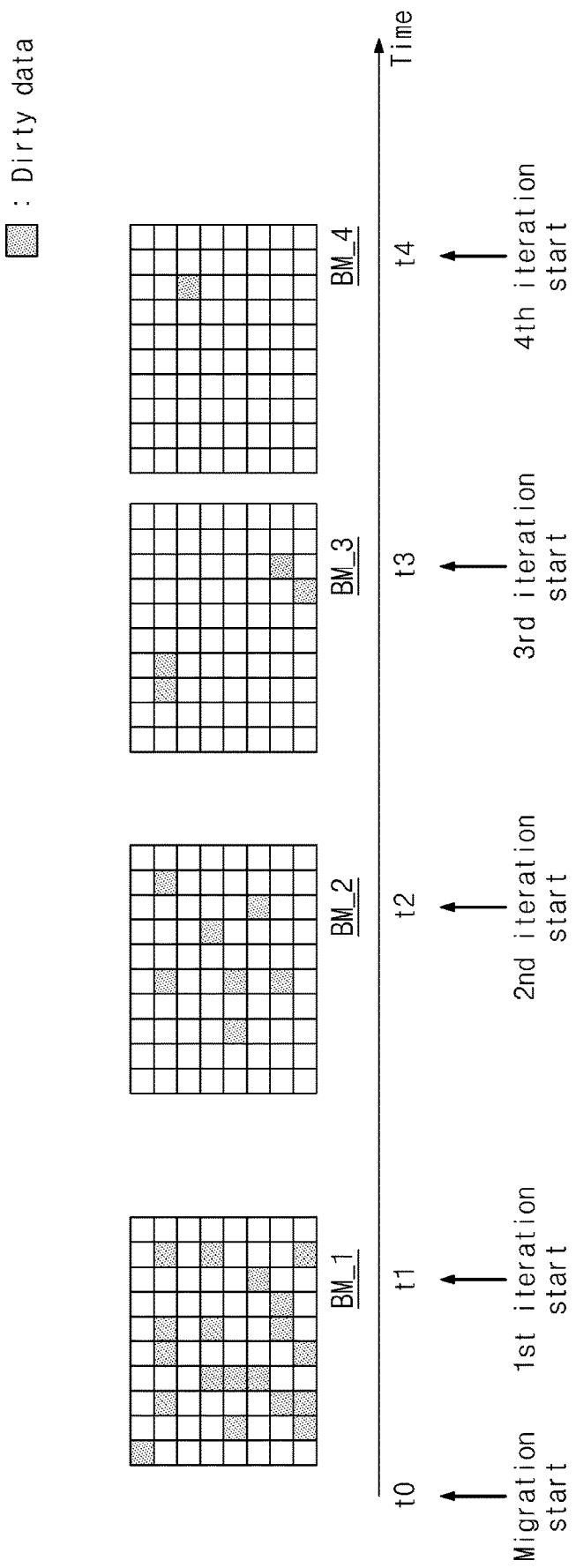
FIG. 4 is a diagram for describing a bitmap provided from a storage device to a host device depending on an iteration operation of the flowchart of FIG. 3.

FIG. 4 is a diagram for describing a bitmap provided from a storage device to a host device depending on an iteration operation of the flowchart of FIG. 3. Referring to FIGS. 1 to 4, at a 0-th time t0, the host device 110 and/or the storage device 120 may start the migration. For example, during a time period from t0 to t1, the host device 110 and/or the storage device 120 may perform operation S100, operation S120, and/or operation S130. In some example embodiments, during the time period from t0 to t1, the storage device 120 may manage information about dirty data generated by the first virtual machine VM1 by using the first bitmap BM_1.

At the first time t1, the host device 110 and/or the storage device 120 may start the first iteration operation. For example, during a time period from t1 to t2, the host device 110 and/or the storage device 120 may perform operation S130 (in this case, i=1). In this case, the host device 110 may receive the first bitmap BM_1 from the storage device 120. The host device 110 may perform migration on dirty data based on the first bitmap BM_1. In some example embodiments, during the time period from t1 to t2, the storage device 120 may manage information about dirty data generated by the first virtual machine VM1 by using the second bitmap BM_2.

At the second time t2, the host device 110 and/or the storage device 120 may start the second iteration operation. For example, during a time period from t2 to t3, the host device 110 and/or the storage device 120 may perform operation S130 (in this case, i=2). In this case, the host device 110 may receive the second bitmap BM_2 from the storage device 120. The host device 110 may perform migration on dirty data based on the second bitmap BM_2. In some example embodiments, during the time period from t2 to t3, the storage device 120 may manage information about dirty data generated by the first virtual machine VM1 by using the third bitmap BM_3.

At the third time t3, the host device 110 and/or the storage device 120 may start the third iteration operation. For example, during a time period from t3 to t4, the host device 110 and/or the storage device 120 may perform operation S130 (in this case, i=3). In this case, the host device 110 may receive the third bitmap BM_3 from the storage device 120. The host device 110 may perform migration on dirty data based on the third bitmap BM_3. In some example embodiments, during the time period from t3 to t4, the storage device 120 may manage information about dirty data generated by the first virtual machine VM1 by using a fourth bitmap BM_4.

At the fourth time t4, the host device 110 and/or the storage device 120 may start the fourth iteration operation. In some example embodiments, the fourth iteration operation may include operation S136, operation S137, and/or operation S138 of FIG. 3.

As described above, the host device 110 and/or the storage device 120 may perform the iteration operation for the purpose of maintaining up-to-date dirty data in source data migration. In this case, as illustrated in FIG. 4, the amount (e.g., number) of dirty data may decrease as the iteration operation is performed.

In some example embodiments, as described above, the host device 110 may determine dirty data based on a bitmap provided from the storage device 120. In this case, the storage device 120 sends the entire bitmap (e.g., the bitmap of the entire size) to the host device 110 every iteration operation, regardless of the number of dirty data. That is, in the iteration operation, an operation delay may be caused by the transfer of the bitmap.

In some example embodiments of the inventive concepts, a delay time due to the bitmap transfer may decrease by managing and sending information about dirty data by using dirty information with a variable size, not a bitmap with a fixed mapping unit. Below, an operation method of a storage system according to an embodiment of the inventive concepts will be described in detail.

Figure 5:
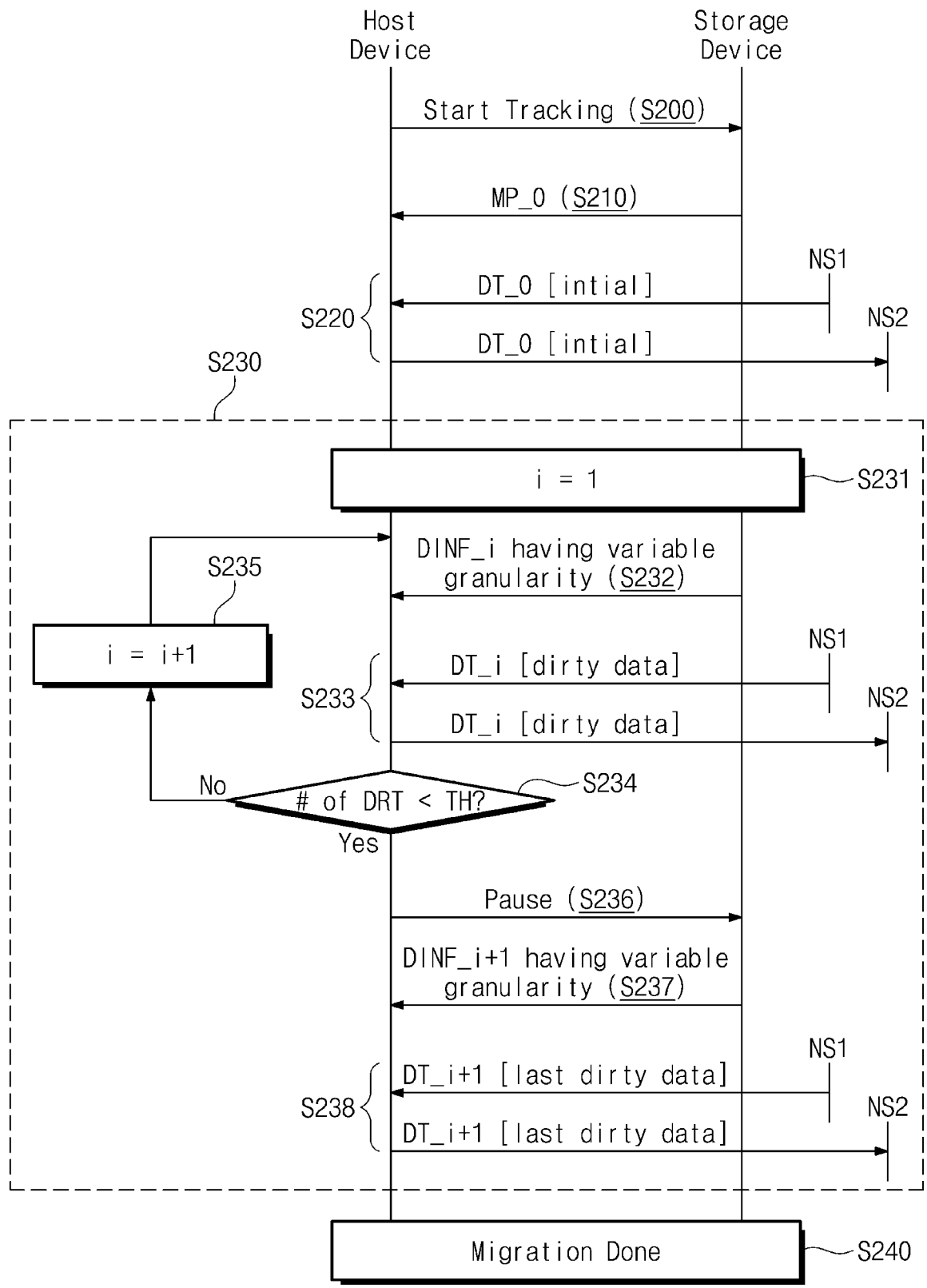
FIG. 5 is a flowchart illustrating an operation of a storage system of FIG. 1.

FIG. 5 is a flowchart illustrating an operation of a storage system of FIG. 1. For convenience of description, additional description associated with the components described above will be omitted to avoid redundancy. Referring to FIGS. 1, 2, and 5, the host device 110 and/or the storage device 120 may perform operation S200, operation S210, and/or operation S220. Operation S200, operation S210, and/or operation S220 are similar to operation S100, operation S110, and/or operation S120 of FIG. 3, and thus, additional description will be omitted to avoid redundancy.

Afterwards, the host device 110 and/or the storage device 120 may perform operation S230. Operation S230 may include operation S231 to operation S238. Operation S230 is similar to operation S130 of FIG. 3 except for operation S232 and/or operation S27, and thus, additional description will be omitted to avoid redundancy.

In some example embodiments, in operation S232, the host device 110 may receive i-th dirty information DINF_i with the variable granularity from the storage device 120. In contrast, in operation S132 of FIG. 3, the host device 110 receives the i-th bitmap BM_i from the storage device 120.

In this case, the i-th bitmap BM_i has the fixed mapping unit with regard to the source data, and the entire i-th bitmap BM_i is transferred from the storage device 120 to the host device 110. In contrast, in operation S232 of FIG. 5, the i-th dirty information DINF_i with the variable granularity has a mapping unit that is variable with regard to the source data. In this case, the i-th dirty information DINF_i may be smaller in size than the i-th bitmap BM_i, and thus, the latency necessary or sufficient to receive dirty information may decrease. In some example embodiments, the i-th dirty information DINF_i may be generated based on the i-th bitmap BM_i; as in the above description, while the above iteration operation is performed, the storage device 120 manages information about dirty data generated from the source data by using the bitmap BM_i. For example, during a time period from a point in time when the first bitmap BM_1 is transferred to a point in time when the migration of the source data (e.g., first dirty data) is completed, the storage device 120 manages information about second dirty data generated from the source data by using the second bitmap BM_2. Afterwards, during a time period from a point in time when the second bitmap BM_2 is transferred to a point in time when the migration of second source data (e.g., the second dirty data) is completed, the storage device 120 manages information about third dirty data generated from the source data by using the third bitmap BM_3. In some example embodiments, the storage device 120 may manage a bitmap for generating next dirty information in response to the query request for the dirty information. Operation S232 will be described in detail with reference to FIGS. 6 and 7.

Operation S237 is similar to operation S232 except that (i+1)-th dirty information DINF_i+1 is received, and thus, additional description will be omitted to avoid redundancy.

As described above, in the migration and/or live migration, information for determining dirty data may be transferred by using dirty information with the variable granularity, and thus, a total of time taken to perform migration may be shortened.

Figure 6:
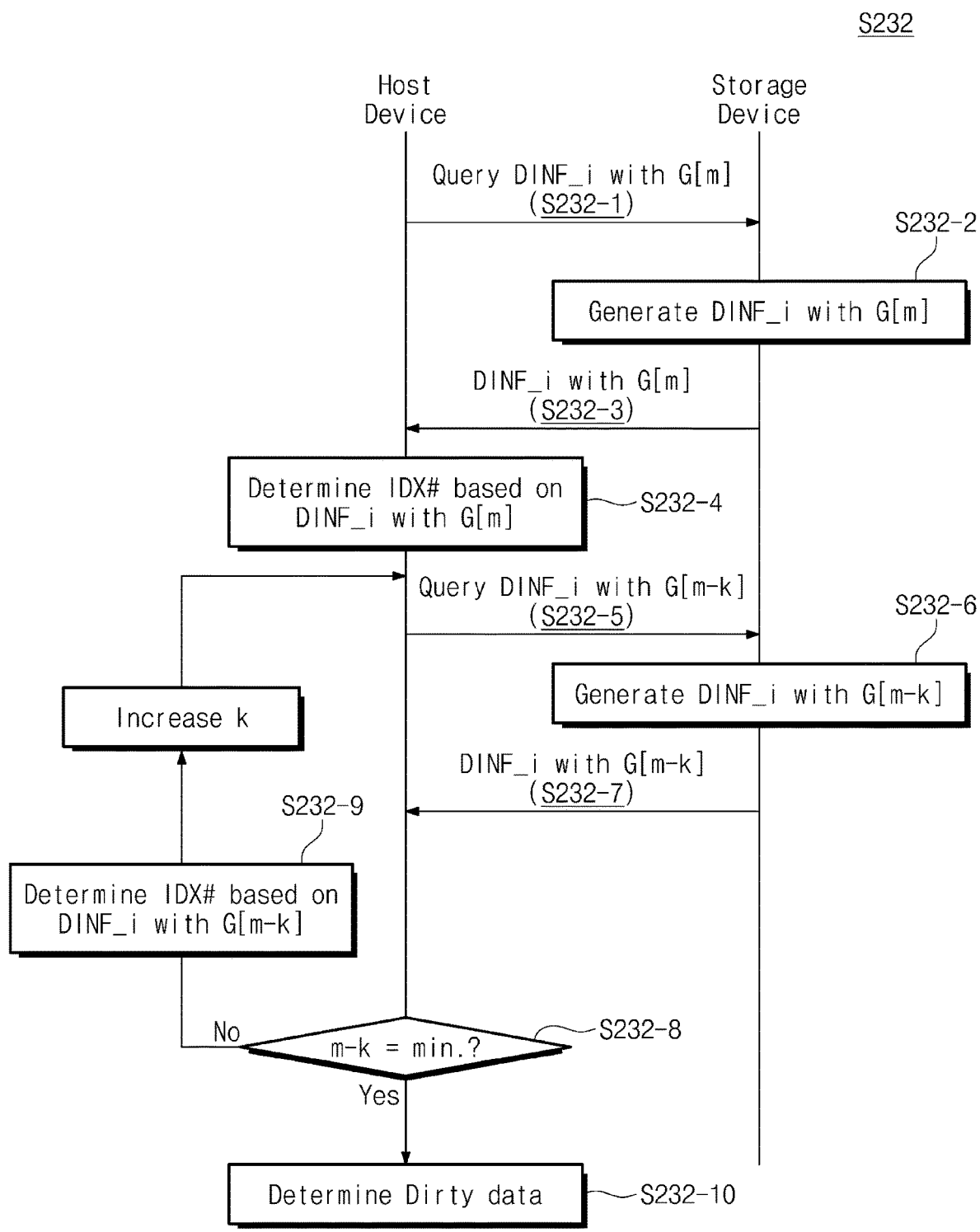
FIG. 6 is a flowchart illustrating operation S232 of FIG. 5, that is, an operation of sending and receiving dirty data with variable granularity.

FIG. 6 is a flowchart illustrating operation S232 of FIG. 5, that is, an operation of sending and receiving dirty data with variable granularity. Referring to FIGS. 1, 2, 5, and 6, operation S232 may include operation S232-1 to operation S232-10.

Below, the term G[m] is used. G[m] may mean the size of source data or a bitmap corresponding to or mapped onto each, or one or more, of a plurality of bits included in the dirty information DINF. That is, one bit included in the dirty information DINF with the mapping unit of G[m] may indicate dirty information (e.g., whether it is dirty data) about m-byte source data (m being a positive integer). Alternatively, one bit included in the dirty information DINF with the unit of G[m] may correspond to m bits among bits included in the bitmap BM. Below, for convenience of description, it is assumed that G[m] means the number of bits of a bitmap corresponding to one bit of the dirty information DINF. That is, in the case of G[8], 8 bits of the bitmap BM may correspond to one bit of the dirty information DINF; in the case of G[1], one bit of the bitmap BM may correspond to one bit of the dirty information DINF.

In operation S232-1, the host device 110 may send, to the storage device 120, the query request for i-th sub-dirty information DINF_i_G[m] with the unit of G[m]. In an embodiment, m is a positive integer.

In operation S232-2, the storage device 120 may generate the i-th sub-dirty information DINF_i_G[m] with the unit of G[m] in response to the query request received from the host device 110. For example, for convenience of description, it is assumed that the bitmap BM_i managed by the storage device 120 is composed of 64 bits. In this case, when the query request received from the host device 110 is a request for i-th sub-dirty information DINF_i_G[m] with the unit of G[8], the storage device 120 may generate i-th sub-dirty information DINF_i_G[ ] of 8 bits, based on the i-th bitmap BM_i of 64 bits. In this case, one bit of the i-th sub-dirty information DINF_i_G[ ] of 8 bits may correspond to 8 bits of the i-th bitmap BM_i. This will be described in detail with reference to FIG. 7.

In operation S232-3, the storage device 120 may send the i-th sub-dirty information DINF_i_G[m] with the unit of G[m] to the host device 110.

In operation S232-4, the host device 110 may determine index information IND #based on the i-th sub-dirty information DINF_i_G[m]. For example, it is assumed that the i-th sub-dirty information DINF_i_G[ ] is [01000011] and a bit value of "1" indicates "dirty". In this case, the host device 110 may determine the index information IND #corresponding to a bit value of "1".

In operation S232-5, the host device 110 may send, to the storage device 120, the query request for requesting i-th sub-dirty information DINF_i_G[m-k] with the unit of G[m-k]. In some example embodiments, the query request transferred in operation S232-5 may include the index information determined in operation S232-4.

In operation S232-6, the storage device 120 may generate the i-th sub-dirty information DINF_i_G[m-k] with the unit of G[m-k]. In an embodiment, operation S232-6 is similar to operation S232-2 except that the units (e.g., G[m-k] and/or G[m]) are different, and thus, additional description will be omitted to avoid redundancy. In some example embodiments, the size of the i-th sub-dirty information DINF_i_G [m-k] with the unit of G[m-k] may be larger than the size of the i-th sub-dirty information DINF_i_G[m] with the unit of G[m].

In operation S232-7, the storage device 120 may send at least a portion of the i-th sub-dirty information DINF_i_G [m-k] with the unit of G[m-k] to the host device 110. In example, the storage device 120 may send, to the host device 110, information corresponding to the index information IND #(received in operation S232-5) of the i-th sub-dirty information DINF_i_G[m-k] with the unit of G[m-k].

In operation S232-8, the host device 110 determines whether a value of (m-k) (e.g., a mapping unit of sub-dirty information) is minimum (e.g., below a threshold). When the value of (m-k) (e.g., a mapping unit of sub-dirty information) is not minimum (e.g., below the threshold), in operation S232-9, the host device 110 may determine the index information IND #based on the i-th sub-dirty information DINF_i_G[m-k] with the unit of G[m-k]. Afterwards, a value of "k" increases. Afterwards, the host device 110 and/or the storage device 120 iteratively perform operation S232-5 to operation S232-8.

When the value of (m-k) (e.g., a mapping unit of sub-dirty information) is minimum (e.g., below a threshold), in operation S232-10, the host device 110 may determine dirty data based on the plurality of sub-dirty information thus received. Afterwards, the host device 110 may perform migration (operation S233 of FIG. 5) on the dirty data.

In some example embodiments, the value of "k" may be controlled depending on various manners. For example, the value of "k" may be determined depending on a given size or order. In this case, the unit of sub-dirty information may sequentially decrease. Alternatively, the value of "k" may be determined depending on the determined index information.

For example, when the number of index information determined in operation S232-9 is less than or equal to a specific value, the value of "k" may increase sequentially or in a given order. In contrast, when the number of index information determined in operation S232-9 is more than the specific value, the value of "k" may increase relatively greatly or may increase such that (m-k) is set to "1". That the number of index information is more than the specific value means that the size of sub-dirty information with the variable granularity is relatively large. As such, the sub-dirty information with the unit of G[1] may be immediately received by increasing the value of "k" greatly; in this case, the size of the entire sub-dirty information may decrease compared to the case of sequentially increasing the value of "k".

As described above, according to some example embodiments of the inventive concepts, the host device 110 may receive information about dirty data by using sub-dirty information with the variable granularity, not the full size of bitmap BM, and thus, the size of information of dirty data may decrease. In this case, a time or latency necessary or sufficient to send and receive information about dirty data may decrease.

Figure 7:
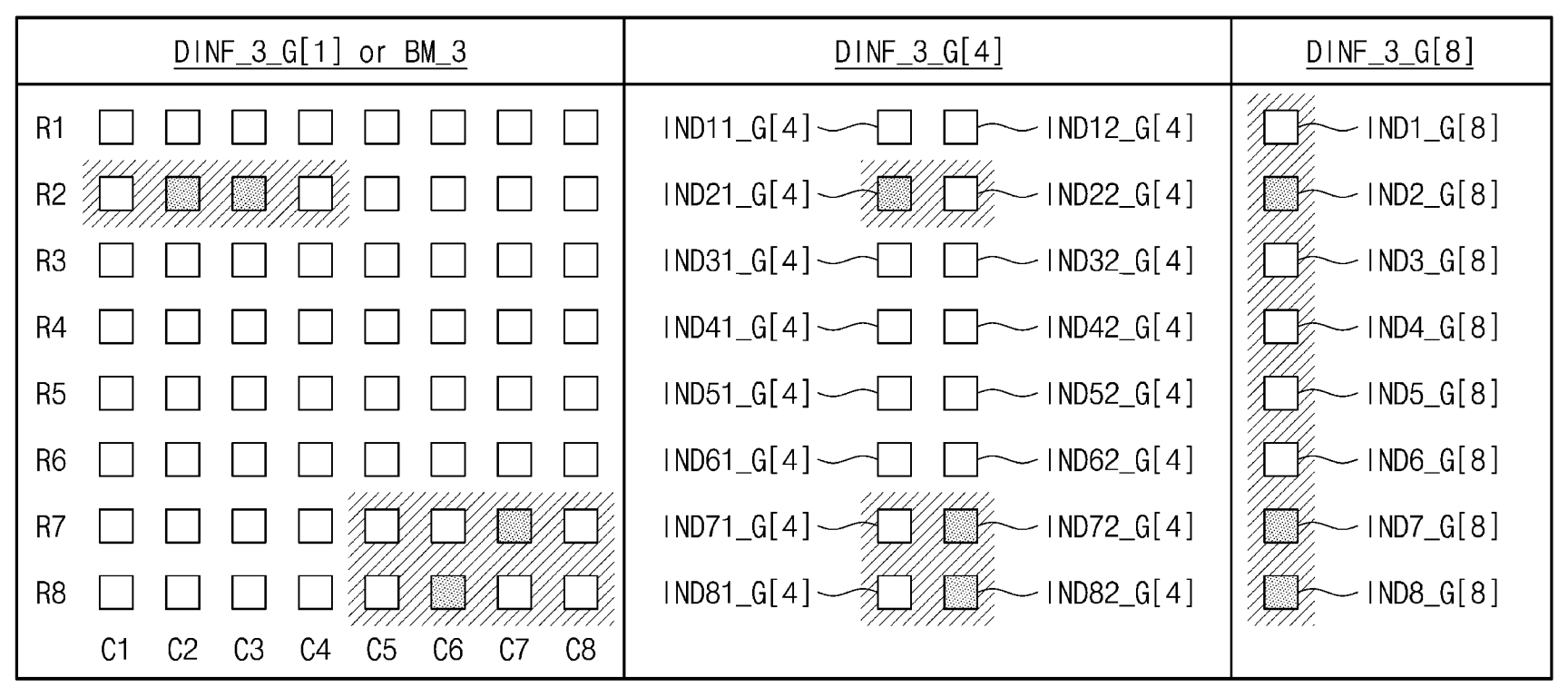

FIG. 7 is a diagram for describing an operation according to the flowchart of FIG. 6 (e.g., an operation of sending and receiving dirty data with variable granularity) in detail. For convenience of description, example embodiments where, when the third iteration operation described with reference to FIG. 4 starts, the host device 110 receives sub-dirty information from the storage device 120 will be described. Also, for convenience of description, it is assumed that the third bitmap BM_3 has an 8×8 data structure (e.g., is composed of a total of 64 bits).

For convenience of description, the term "RaCb bit" is used. The RaCb bit indicates a bit at the a-th row and b-th column. That the RaCb bit is marked may indicate that source data corresponding to the RaCb bit are dirty data. For convenience of description, the term "rXcY bit of the dirty information DINF_G[k]" is used. The rXcY bit of the dirty information DINF_G[k] indicates a bit at the X-th row and Y-th column in information or a matrix or vector associated with the DINF_G[k]. That the The rXcY bit of the dirty information DINF_G[k] is marked may indicate that source data corresponding to the rXcY bit of the dirty information DINF_G[k] are dirty data.

Referring to FIGS. 1, 2, 5, 6, and 7, at the time t3 when the third iteration operation starts, the third bitmap BM_3 may have a structure illustrated in FIG. 7. For example, in the third bitmap BM_3, an R2C2 bit, an R2C3 bit, an R7C7 bit, and/or an R8C6 bit may be marked. That is, in the third iteration operation described with reference to FIG. 4, source data corresponding to or mapped onto the R2C2 bit, the R2C3 bit, the R7C7 bit, and/or the R8C6 bit may migrate from the first namespace NS1 to the second namespace NS2.

In the example embodiments described with reference to FIGS. 3 and 4, at the third time t3 when the third iteration operation starts, the third bitmap BM_3 (e.g., 64-bit data) may be transferred to the host device 110. In contrast, in the example embodiment described with reference to FIGS. 5 to 7, at the third time t3 when the third iteration operation starts, sub-dirty information (e.g., DINF_3_G[8], DINF_3_G[4], and/or DINF_3_G[1])) with the variable granularity may be transferred to the host device 110. In this case, the size of information or data that are transferred to the host device 110 decreases.

For example, the host device 110 may send the query request for receiving DINF_3_G[8] to the storage device

120. The storage device 120 may generate DINF_3_G[8] in response to the query request and may send DINF_3_G[8] to the host device 110. In this case, the storage device 120 may generate DINF_3_G[8] composed of 8 bits, based on the third bitmap BM_3. Each, or one or more, bit of DINF_3_G[8] may correspond to 8 bits of the third bitmap BM_3.

In detail, the r1c1 bit of DINF_3_G[8] corresponds to 8 bits of the first row R1 of the third bitmap BM_3; the r2c1 bit of DINF_3_G[8] corresponds to 8 bits of the second row R2 of the third bitmap BM_3; the r3c1 bit of DINF_3_G[8] corresponds to 8 bits of the third row R3 of the third bitmap BM_3; the r4c1 bit of DINF_3_G[8] corresponds to 8 bits of the fourth row R4 of the third bitmap BM_3; the r5c1 bit of DINF_3_G[8] corresponds to 8 bits of the fifth row R5 of the third bitmap BM_3; the c6c1 bit of DINF_3_G[8] corresponds to 8 bits of the sixth row R6 of the third bitmap BM_3; the r7c1 bit of DINF_3_G[8] corresponds to 8 bits of the seventh row R7 of the third bitmap BM_3; and/or, the r8c1 bit of DINF_3_G[8] corresponds to 8 bits of the eighth row R8 of the third bitmap BM_3. In this case, in the third bitmap BM_3, because the R2C2 bit, the R2C3 bit, the R7C7 bit, and/or R8C6 bit are marked, the second, seventh, and/or eighth bits of DINF_3_G[8] may be marked to indicate dirty data.

The host device 110 may determine index information based on the 8-bit information of DINF_3_G[8]. For example, the host device 110 may determine index information of bits, which are marked to indicate dirty data, from among the 8 bits of DINF_3_G[8]. In the embodiment of FIG. 7, the index information that is based on the 8 bits of DINF_3_G[8] may be IND2_G[8], IND7_G[8], and/or IND8_G[8] respectively corresponding to the second, seventh, and/or eighth bits of DINF_3_G[8].

The host device 110 may send, to the storage device 120, the query request for receiving DINF_3_G[4] whose unit is smaller than G[8], from the storage device 120. The storage device 120 may generate DINF_3_G[4] composed of 16 bits based on the third bitmap BM_3 in response to the query request. Each, or one or more, bit of DINF_3_G[4] may correspond to 4 bits of the third bitmap BM_3.

In detail, the r1c1 bit of DINF_3_G[4] corresponds to 4 bits at the first row R1 and first to fourth columns C1 to C4 of the third bitmap BM_3; the r2c1 bit of DINF_3_G[4] corresponds to 4 bits at the second row R2 and first to fourth columns C1 to C4 of the third bitmap BM_3; the r3c1 bit of DINF_3_G[4] corresponds to 4 bits at the third row R3 and first to fourth columns C1 to C4 of the third bitmap BM_3; the r4c1 bit of DINF_3_G[4] corresponds to 4 bits at the fourth row R4 and first to fourth columns C1 to C4 of the third bitmap BM_3; the r5c1 bit of DINF_3_G[4] corresponds to 4 bits at the fifth row R5 and first to fourth columns C1 to C4 of the third bitmap BM_3; the r6c1 bit of DINF_3_G[4] corresponds to 4 bits at the sixth row R6 and first to fourth columns C1 to C4 of the third bitmap BM_3; the r7c1 bit of DINF_3_G[4] corresponds to 4 bits at the seventh row R7 and first to fourth columns C1 to C4 of the third bitmap BM_3; and/or, the r8c1 bit of DINF_3_G[4] corresponds to 4 bits at the eighth row R8 and first to fourth columns C1 to C4 of the third bitmap BM_3. The r1c2 bit of DINF_3_G[4] corresponds to 4 bits at the first row R1 and fifth to eighth columns C5 to C8 of the third bitmap BM_3; the r2c2 bit of DINF_3_G[4] corresponds to 4 bits at the second row R2 and fifth to eighth columns C5 to C8 of the third bitmap BM_3; the r3c2 bit of DINF_3_G[4] corresponds to 4 bits at the third row R3 and fifth to eighth columns C5 to C8 of the third bitmap BM_3; the r4c2 bit of DINF_3_G[4] corresponds to 4 bits at the fourth row R4 and fifth to eighth columns C5 to C8 of the third bitmap BM_3; the r5c2 bit of DINF_3_G[4] corresponds to 4 bits at the fifth row R5 and/or fifth to eighth columns C5 to C8 of the third bitmap BM_3; the r6c2 bit of DINF_3_G[4] corresponds to 4 bits at the sixth row R6 and fifth to eighth columns C5 to C8 of the third bitmap BM_3; the r7c2 bit of DINF_3_G[4] corresponds to 4 bits at the seventh row R7 and fifth to eighth columns C5 to C8 of the third bitmap BM_3; and/or, the r8c2 bit of DINF_3_G[4] correspond to 4 bits at the eighth row R8 and fifth to eighth columns C5 to C8 of the third bitmap BM_3. In this case, in the third bitmap BM_3, because the R2C2 bit, the R2C3 bit, the R7C7 bit, and/or R8C6 bit are marked, the r2c1, r7c2, and/or r8c2 bits of DINF_3_G[4] may be marked to indicate dirty data.

Instead of sending the entire sub-dirty information DINF_3_G[4] to the host device 110, the storage device 120 may send a portion of DINF_3_G[4] to the host device 110 based on the index information received from the host device 110. For example, as described above, the host device 110 may determine index information IND2_G[8], IND7_G[8], and/or IND8_G[8] based on the 8-bit information of DINF_3_G[8]. The host device 110 sends the determined index information to the storage device 120 together with the query request for receiving DINF_3_G[4].

In this case, the storage device 120 may send only information or data corresponding to the received index information IND2_G[8], IND7_G[8], and/or IND8_G[8] from among DINF_3_G[4] thus generated.

In some example embodiments, information or data corresponding to index information from among sub-dirty information may indicate information or data corresponding to bits associated with the index information from among bits of a bitmap. For example, a bit associated with IND2_G[8] corresponds to bits at the second row R2 of the third bitmap BM_3. In this case, bits corresponding to the bits at the second row R2 from among the bits of DINF_3_G[4] may be r2c1 and/or r2c2 bits. Likewise, a bit associated with IND7_G[8] corresponds to bits at the seventh row R7 of the third bitmap BM_3; in this case, bits corresponding to the bits at the seventh row R7 from among the bits of DINF_3_G[4] may be r7c1 and/or r7c2 bits. A bit associated with IND8_G[8] corresponds to bits at the eighth row R8 of the third bitmap BM_3; in this case, bits corresponding to the bits at the eighth row R8 from among the bits of DINF_3_G[4] may be r8c1 and/or r8c2 bits.

As such, the storage device 120 may send only some (e.g., r2c1, r2c2, r7c1, r7c2, r8c1, and/or r8c2 bits) of the bits of DINF_3_G[4] to the host device 110 based on the received index information IND2_G[8], IND7_G[8], and/or IND8_G[8].

Afterwards, the host device 110 may again determine the index information based on the some bits (e.g., r2c1, r2c2, r7c1, r7c2, r8c1, and/or r8c2 bits) of DINF_3_G[4]. For example, as described above, the host device 110 may determine index information of bits, which are marked to indicate dirty data, from among received bits. In the example embodiments of FIG. 7, the host device 110 may determine the index information of IND21_G[4], IND72_G[4], and/or IND82_G[4] based on the some bits (e.g., r2c1, r2c2, r7c1, r7c2, r8c1, and/or r8c2 bits) of DINF_3_G[4].

Afterwards, the host device 110 may send, to the storage device 120, the query request for receiving DINF_3_G[1] whose unit is smaller than G[4], from the storage device 120. In this case, because the unit of sub-dirty information is "1" (e.g., G[1]), the storage device 120 may send a portion of the third bitmap BM_3 to the host device 110 as sub-dirty information in response to the query request.

For example, as described above, the host device 110 may determine index information of IND21_G[4], IND72_G[4], and/or IND82_G[4] based on some bits of DINF_3_G[4]. The host device 110 sends the determined index information to the storage device 120 together with the query request for receiving DINF_3_G[1].

In this case, the storage device 120 may send, to the host device 110, bits corresponding to the received index information IND21_G[4], IND72_G[4], and/or IND82_G[4] from among the bits of the third bitmap BM_3. In detail, a bit associated with IND21_G[4] corresponds to bits at the second row R2 and/or first to fourth columns C1 to C4 of the third bitmap BM_3. A bit associated with IND72_G[4] corresponds to bits at the seventh row R7 and/or fifth to eighth columns C5 to C8 of the third bitmap BM_3. A bit associated with IND82_G[4] corresponds to bits at the eighth row R8 and/or fifth to eighth columns C5 to C8 of the third bitmap BM_3. The storage device 120 sends bits respectively corresponding to the index information IND21_G[4], IND72_G[4], and/or IND82_G[4] to the host device 110. The host device 110 may determine that source data corresponding to the R2C2, R2C3, R7C7, and/or R8C6 bits of the third bitmap BM_3 are dirty data, based on the received dirty information DINF_3_G[8], DINF_3_G[4], and/or DINF_3_G[1].

In some example embodiments, the size of data that are exchanged to obtain information about dirty data may decrease by sending sub-dirty information with the variable granularity, as described above, rather than the transfer of the entire bitmap to the host device 110. For example, as described with reference to FIG. 7, the third bitmap BM_3 may have a 64-bit, that is, 8×8 structure. In contrast, in the case where sub-dirty information with the variable granularity is transferred, a total of 36 bits, that is, 8 bits of DINF_3_G[8], 6 bits of DINF_3_G[4], and/or 12 bits of DINF_3_G[1] are transferred to the host device 110. That is, according to some example embodiments of the inventive concepts, the transfer of sub-dirty information with the variable granularity may make it possible to reduce the total size of data to be transferred, compared to the case of sending the entire bitmap. Accordingly, a total of time or latency necessary or sufficient for migration may decrease.

Figure 8:
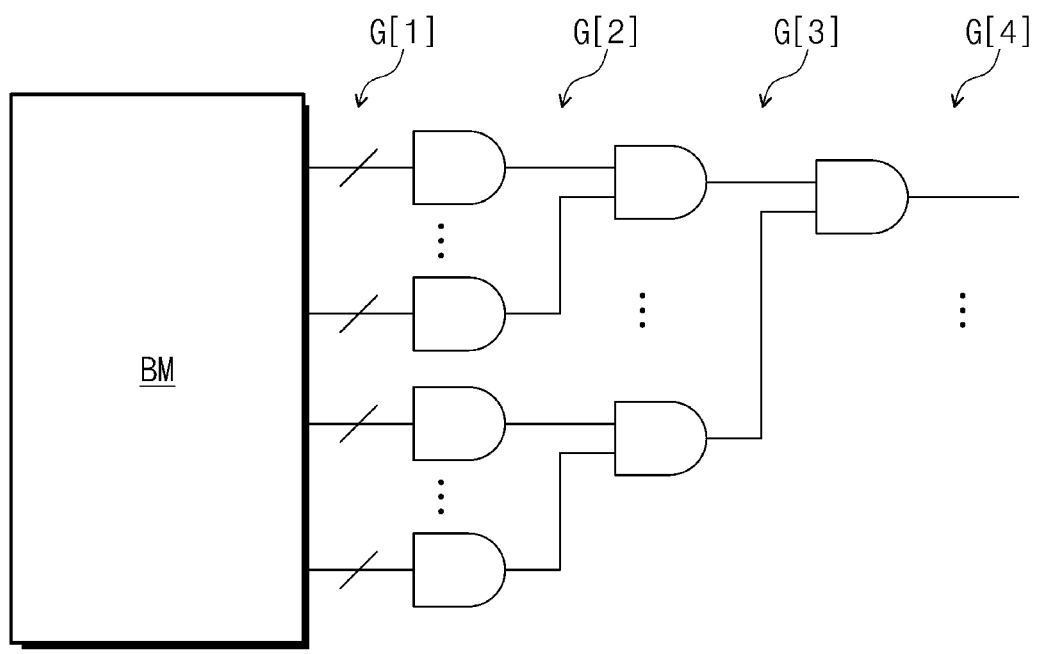
FIG. 8 is a conceptual diagram for describing an operation of a dirty manager of FIG. 1.

FIG. 8 is a conceptual diagram for describing an operation of a dirty manager of FIG. 1. Referring to FIGS. 1 and 8, the dirty manager 121a may be configured to manage or mark dirty data associated with source data during the live migration of the storage system 100. For example, during the live migration of the storage system 100, when dirty data are generated from the source data, the dirty manager 121a may be configured to mark a bit corresponding to the dirty data from among bits of the bitmap BM. In some example embodiments, the bitmap BM may be reset whenever the iteration operation starts. Alternatively, the bitmap BM may be implemented in plurality, and the plurality of bitmaps BM may be swapped or reset when the iteration operation starts.

The dirty manager 121a may be configured to generate sub-dirty information in response to the query request received from the host device 110. For example, the dirty manager 121a may include a plurality of AND operators. The plurality of AND operators may perform an AND operation on a plurality of bits of the bitmap BM. Outputs of the plurality of AND operators may be used as sub-dirty information.

In detail, all, or one or more, the bits of the bitmap BM are input to a first AND stage. An input of the first AND stage is used as the sub-dirty information DINF_G[1] with the unit of G[1]. An output of the first AND stage is used as the sub-dirty information DINF_G[4] with the unit of G[4]. The output of the first AND stage are input to a second AND stage. An output of the second AND stage is used as the sub-dirty information DINF_G[8] with the unit of G[8]. Likewise, the output of the second AND stage are input to a third AND stage, and an output of the third AND stage is used as the sub-dirty information DINF_G[16] with the unit of G[16].

In some example embodiments, outputs of the plurality of AND operators may be selected depending on the query request of the host device 110. Also, the outputs of the plurality of AND operators may be selectively transferred to the host device 110 depending on index information received from the host device 110. This is capable of being implemented through the above configurations and operations, and thus, additional description will be omitted to avoid redundancy. In some example embodiments, the above configuration is provided as an example, and the unit of sub-dirty information or a way to generate sub-dirty information may be variously changed or modified depending on various ways to implement.

Figure 9:
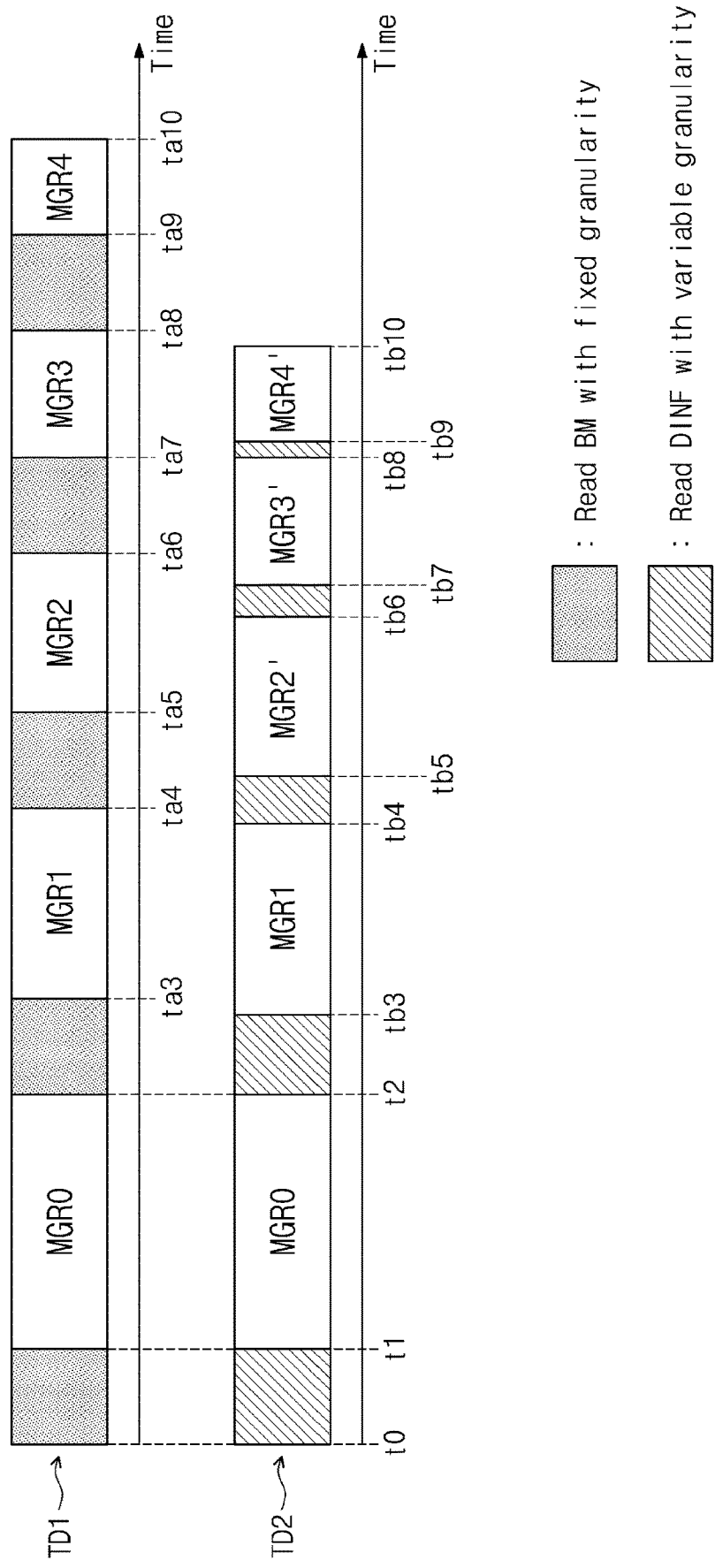
FIG. 9 is a timing diagram for describing an operation of a storage system according to some example embodiments of the inventive concepts.

FIG. 9 is a timing diagram for describing an operation of a storage system according to some example embodiments of the inventive concepts. To describe advantages according to some example embodiments of the inventive concepts clearly, the operation described with reference to FIGS. 3 and 4 and the operation described with reference to FIGS. 5 to 8 will be compared.

Referring to FIGS. 1, 3, 5, and 9, a first timing diagram TD1 of FIG. 9 shows an example of the operation described with reference to FIGS. 3 and 4, and a second timing diagram TD2 of FIG. 9 shows an example of the operation described with reference to FIGS. 5 to 8.

First, as illustrated in the first timing diagram TD1, at t0, the storage system 100 may start the live migration. During a time period from t0 to t1, the host device 110 may receive the initial mapping information MP_0 from the storage device 120. Afterwards, during a time period from t1 to t2, the storage system 100 may perform migration such that source data present in the first namespace NS1 migrate to the second namespace NS2.

In a time period from t2 to ta3, the host device 110 may receive information about dirty data from the storage device 120. In this case, as described with reference to FIGS. 3 and 4, in the case where a bitmap with the fixed granularity is provided as information about dirty data, the transfer of the bitmap may be completed at ta3.

Afterwards, during a time period from ta3 to ta4, a first iteration operation MGR1 for dirty data may be performed. In some example embodiments, dirty data targeted for migration in the first iteration operation MGR1 may be dirty data generated during the time period from t0 to t2.

Afterwards, during a time period ta4 to ta5, the bitmap transfer may be performed. Afterwards, during a period from ta5 to ta6, a second iteration operation MGR2 for dirty data may be performed. In some example embodiments, dirty data targeted for migration in the second iteration operation MGR2 may be dirty data generated during the time period from t2 to ta4.

Afterwards, during a time period ta6 to ta7, the bitmap transfer may be performed. Afterwards, during a period from ta7 to ta8, a third iteration operation MGR3 for dirty data may be performed. In some example embodiments, dirty data targeted for migration in the third iteration operation MGR3 may be dirty data generated during the time period from ta4 to ta6.

Afterwards, during a time period ta8 to ta9, the bitmap transfer may be performed. Afterwards, during a period from ta9 to ta10, a fourth iteration operation MGR4 for dirty data may be performed. In some example embodiments, dirty data targeted for migration in the fourth iteration operation MGR4 may be dirty data generated during the time period from ta6 to ta8.

Next, as illustrated in the second timing diagram TD2, at t0, the storage system 100 may start the live migration. During a time period from t0 to t1, the host device 110 may receive the initial mapping information MP_0 from the storage device 120. Afterwards, during a time period from t1 to t2, the storage system 100 may perform migration such that source data present in the first namespace NS1 migrate to the second namespace NS2.

Afterwards, during a time period from t2 to tb3, the storage system 100 may perform the transfer associated with sub-dirty information with the variable granularity. For example, during the time period from t2 to tb3, based on the method described with reference to FIGS. 5 to 8, the host device 110 may receive sub-dirty information with the variable granularity from the storage device 120.

In some example embodiments, the period where the sub-dirty information with the variable granularity is transferred, that is, the time period from t2 to tb3 may be shorter than the period where the entire bitmap is transferred, that is, the time period t2 to ta3. How a time taken to transfer information is shortened is described above, and thus, additional description will be omitted to avoid redundancy.

Afterwards, during a time period from tb3 to tb4, a first iteration operation MGR1 for dirty data may be performed. In some example embodiments, dirty data targeted for migration in the first iteration operation MGR1 may be dirty data generated during the time period from t0 to t2.

Afterwards, during a time period from tb4 to tb5, the sub-dirty information with the variable granularity may be transferred to the host device 110 from the storage device 120. Afterwards, during a time period from tb5 to tb6, a second iteration operation MGR2' may be performed. In some example embodiments, dirty data targeted for migration in the second iteration operation MGR2' may be dirty data generated during the time period from t2 to tb4.

Afterwards, during a time period from tb6 to tb7, the sub-dirty information with the variable granularity may be transferred to the host device 110 from the storage device 120. Afterwards, during a time period from tb7 to tb8, a third iteration operation MGR3' may be performed. In some example embodiments, dirty data targeted for migration in the third iteration operation MGR3' may be dirty data generated during the time period from tb4 to tb6.

Afterwards, during a time period from tb8 to tb9, the sub-dirty information with the variable granularity may be transferred to the host device 110 from the storage device 120. Afterwards, during a time period from tb9 to tb10, a fourth iteration operation MGR4' may be performed. In some example embodiments, dirty data targeted for migration in the fourth iteration operation MGR4' may be dirty data generated during the time period from tb6 to tb8.

As described above, according to some example embodiments of the inventive concepts, for example, referring to the second timing TD2, a total of migration time or latency may be shortened. For example, as described above, as the iteration operation is iteratively performed, the number of dirty data decreases. In this case, in the first timing diagram TD1, a bitmap transfer period is uniform regardless of the number of dirty data. In contrast, in the second timing diagram TD2, as the number of dirty data decreases (e.g., as the iteration operation is iteratively performed), a sub-dirty information transfer period is shortened. Also, as the sub-dirty information transfer period is shortened, a time during which dirty data are capable of being generated may be shortened; in this case, a time taken to perform the iteration operation may also be shortened. Accordingly, the performance of the storage system 100 may be improved. For example, according to some example embodiments, a live migration may be accomplished while transmitting less data between the host device and the storage device. Accordingly, processing performance of the host device may be improved during the live migration.

Figure 10:
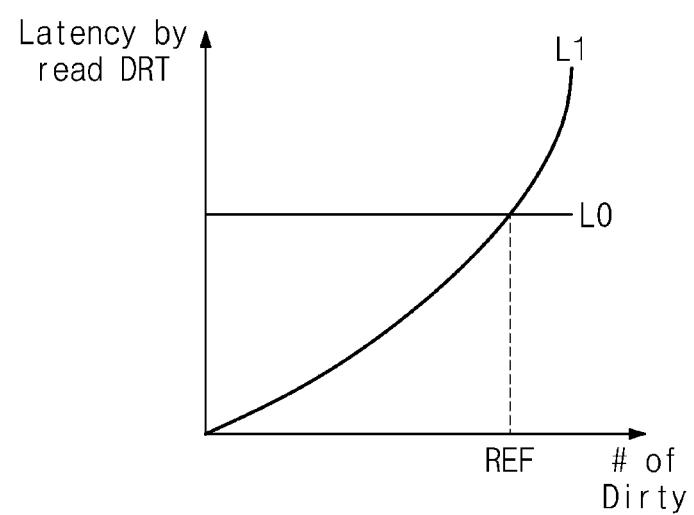
FIG. 10 illustrates a graph for describing an operation of a storage system according to some example embodiments of the inventive concepts.

FIG. 10 illustrates a graph for describing an operation of a storage system according to an embodiment of the inventive concepts. The operation described with reference to FIGS. 3 and/or 4 and the operation described with reference to FIGS. 5 to 8 will be compared with reference to FIG. 10.

In the graph of FIG. 10, a horizontal axis represents the number of dirty data, and a vertical axis represents the latency necessary or sufficient to read information about dirty data. In the graph of FIG. 10, a 0-th line L0 corresponds to the operation described with reference to FIGS. 3 and 4, and a first line L1 corresponds to the operation described with reference to FIGS. 5 to 8.

As understood from the 0-th line L0 of FIG. 10, because the entire bitmap is used as information about dirty data, the latency is uniform regardless of the number of dirty data. In contrast, as understood from the first line L1 of FIG. 10, because sub-dirty data with the variable granularity is used as information about dirty data, as the number of dirty data increases, the size of sub-dirty data increases. Accordingly, because the number of transactions for reading sub-dirty information with the variable granularity increases (e.g., because the number of query requests and the number of times of sub-dirty information transfer according to the query requests increase), the latency may increase.

That is, when the number of dirty data is less than a reference value REF, the operation method according to the first line L1 may be more effective; when the number of dirty data is more than the reference value REF, the operation method according to the 0-th line L0 may be more effective.

Figure 11:
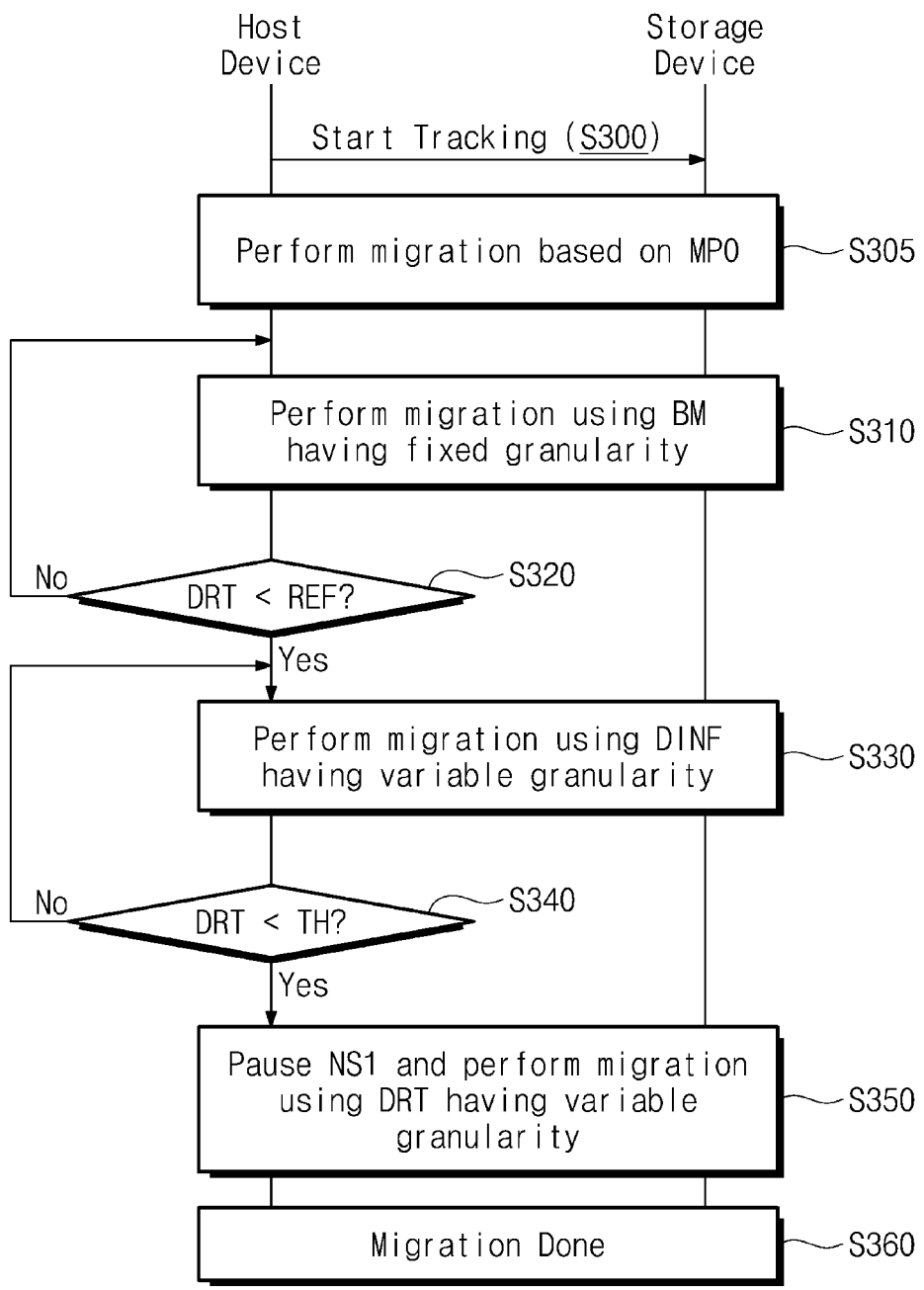
FIG. 11 is a flowchart illustrating an operation method of a storage system of FIG. 1.

FIG. 11 is a flowchart illustrating an operation method of a storage system of FIG. 1. Referring to FIGS. 1, 10, and 11, in operation S300, the host device 110 may send the tracking start request to the storage device 120. Operation S300 is similar to operation S100 of FIG. 3 and operation S200 of FIG. 5 and thus, additional description will be omitted to avoid redundancy.

In operation S305, the host device 110 and/or the storage device 120 may perform migration based on the initial mapping information MP_0. Operation S305 is similar to operation S110 and operation S120 of FIG. 3, and thus, additional description will be omitted to avoid redundancy.

In operation S310, the host device 110 and/or the storage device 120 may perform migration based on a bitmap with the fixed granularity. For example, the host device 110 and/or the storage device 120 may perform migration based on the operation method described with reference to FIGS. 3 and 4. In some example embodiments, operation S310 may indicate one iteration operation described with reference to FIGS. 3 and 4.

In operation S320, the host device 110 may determine whether the number of dirty data is less than the reference value REF. For example, as described with reference to FIG.

10, when the number of dirty data is more than or equal to the reference value REF, the operation method using not sub-dirty information with the variable granularity but the bitmap with the fixed granularity may be more effective. That is, when the number of dirty data is more than or equal to the reference value REF, the host device 110 and/or the storage device 120 may iteratively perform operation S310.

When the number of dirty data is less than the reference value REF, the operation method using not the bitmap with the fixed granularity but the sub-dirty information with the variable granularity may be more effective. In this case, in operation S330, the host device 110 and/or the storage device 120 may perform migration by using the sub-dirty information DINF with the variable granularity. In some example embodiments, operation S330 may indicate one iteration operation described with reference to FIGS. 5 to 9.

Afterwards, in operation S340, the host device 110 may determine whether the number of dirty data is less than the threshold value TH. When the number of dirty data is more than or equal to the threshold value TH, the host device 110 and/or the storage device 120 iteratively perform operation S330.

When the number of dirty data is less than the threshold value TH, in operation S350, the host device 110 and/or the storage device 120 may pause the operation associated with the first namespace NS1 (e.g., may pause the operation associated with the first virtual machine VM1) and may perform migration based on the sub-dirty information with the variable granularity. Afterwards, in operation S360, the migration may be completed.

Figure 12:
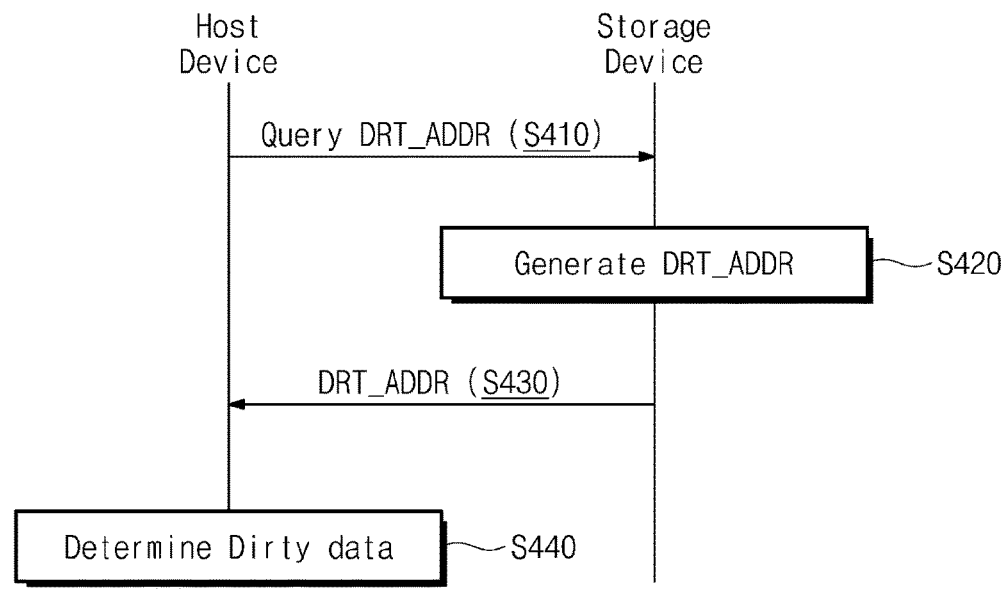
FIG. 12 is a flowchart illustrating an operation of exchanging dirty information according to some example embodiments of the inventive concepts.

FIG. 12 is a flowchart illustrating an operation of exchanging sub-dirty information according to some example embodiments of the inventive concepts. In some example embodiments, the operation according to the flowchart of FIG. 12 may replace S232 of FIG. 5.

Referring to FIGS. 1 and 12, in operation S410, the host device 110 may send the query request for receiving a dirty address DRT_ADDR to the storage device 120. In some example embodiments, the dirty address DRT_ADDR may refer to information indicating a location of a bit of a bitmap, which is marked to indicate dirty data, that is, information indicating a bitmap address.

In operation S420, the storage device 120 may generate the dirty address DRT_ADDR based on the bitmap BM. A configuration of the dirty address DRT_ADDR will be described in detail with reference to FIG. 13.

In operation S430, the storage device 120 may send the dirty address DRT_ADDR to the host device 110.

In operation S440, the host device 110 may determine dirty data based on the dirty address DRT_ADDR. Afterwards, the host device 110 may perform migration on the dirty data.

Figure 13:
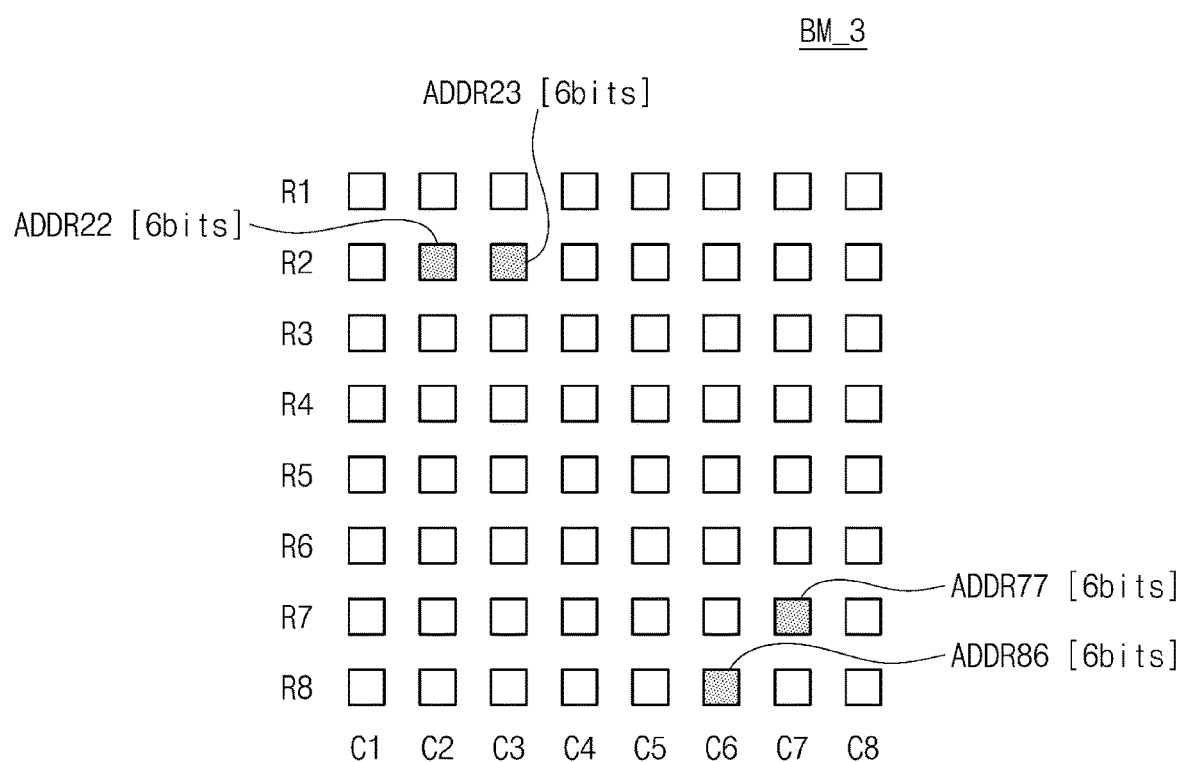
FIG. 13 is a diagram for describing a dirty address in the operation according to the flowchart of FIG. 12.

FIG. 13 is a diagram for describing the dirty address DRT_ADDR in the operation according to the flowchart of FIG. 12. For convenience of description, the dirty address DRT_ADDR will be described with reference to the third bitmap BM_3.

As illustrated in FIG. 13, the third bitmap BM_3 may be composed of 8×8, that is, 64 bits. In this case, each, or one or more, bit of the third bitmap BM_3 may express or designate a 6-bit address.

In this case, the R2C2 bit, the R2C3 bit, the R7C7 bit, and/or the R8C6 bit corresponding to bits marked to indicate dirty data may be respectively expressed by ADDR22, ADDR23, ADDR77, and/or ADDR86, and each, or one or more, of ADDR22, ADDR23, ADDR77, and/or ADDR86 may be expressed by 6 bits. In this case, the number of bits that are transferred from the storage device 120 to the host device 110 is 24 (=6×4). That is, the transfer of the dirty address DRT_ADDR indicating a location of a dirty bit of the bitmap BM may be more efficient than the transfer of the entire 64-bit bitmap BM_3.

Figure 14:
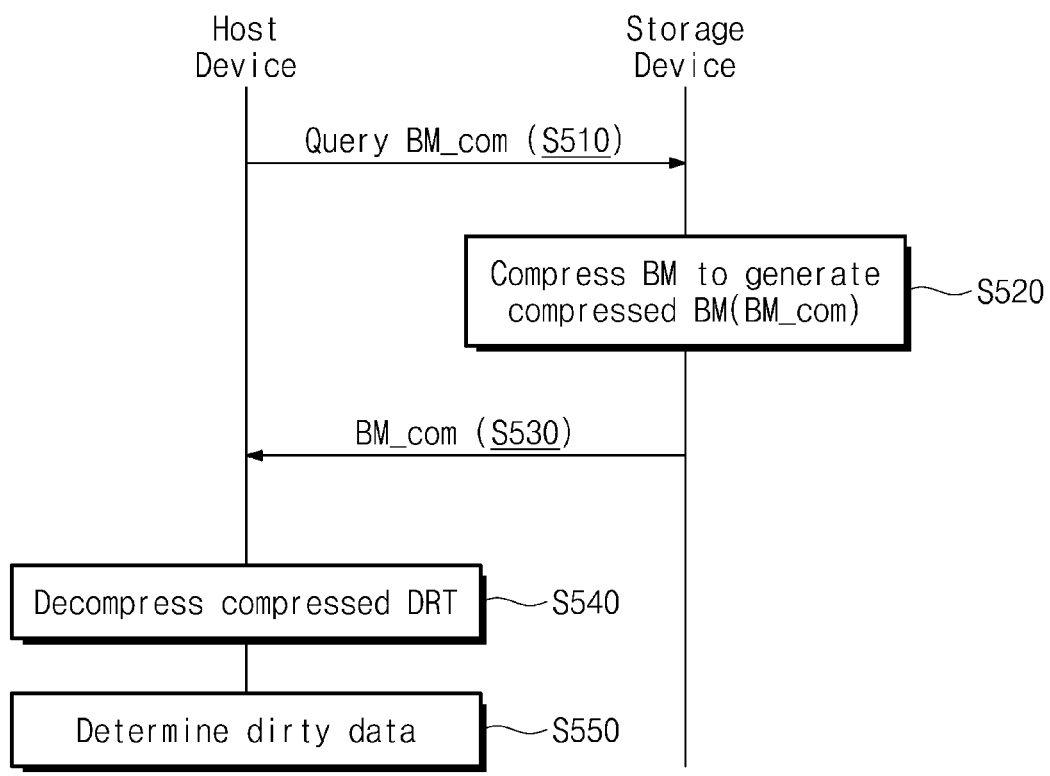
FIG. 14 is a flowchart illustrating an operation of exchanging dirty information according to some example embodiments of the inventive concepts.

FIG. 14 is a flowchart illustrating an operation of exchanging dirty information according to some example embodiments of the inventive concepts. In some example embodiments, the operation according to the flowchart of FIG. 14 may replace operation S232 of FIG. 5.

Referring to FIGS. 1 and 14, in operation S510, the host device 110 may send the query request for receiving a compressed bitmap BM_com to the storage device 120.

In operation S520, the storage device 120 may compress the bitmap BM to generate the compressed bitmap BM_com.

In operation S530, the storage device 120 may send the compressed bitmap BM_com to the host device 110.

In operation S540, the host device 110 may decompress the compressed bitmap BM_com.

In operation S550, the host device 110 may determine dirty data based on the decompressed bitmap.

As described above, the storage device 120 may compress a bitmap and may provide the compressed bitmap to the host device 110. In this case, as described above, as the iteration operation for migration is performed, the number of dirty data may decrease. That is, the number of bits marked as a dirty bit from among bits of the bitmap may decrease. That is, the number of bits having "1" from among the bits of the bitmap may be sparse. As the bitmap is sparse, the efficiency of compression may increase. That is, as the iteration operation for migration is performed, the size of the compressed bitmap BM_com that is provided from the storage device 120 to the host device 110 may decrease; thus, the entire latency of the storage system may decrease.

Figure 15A:
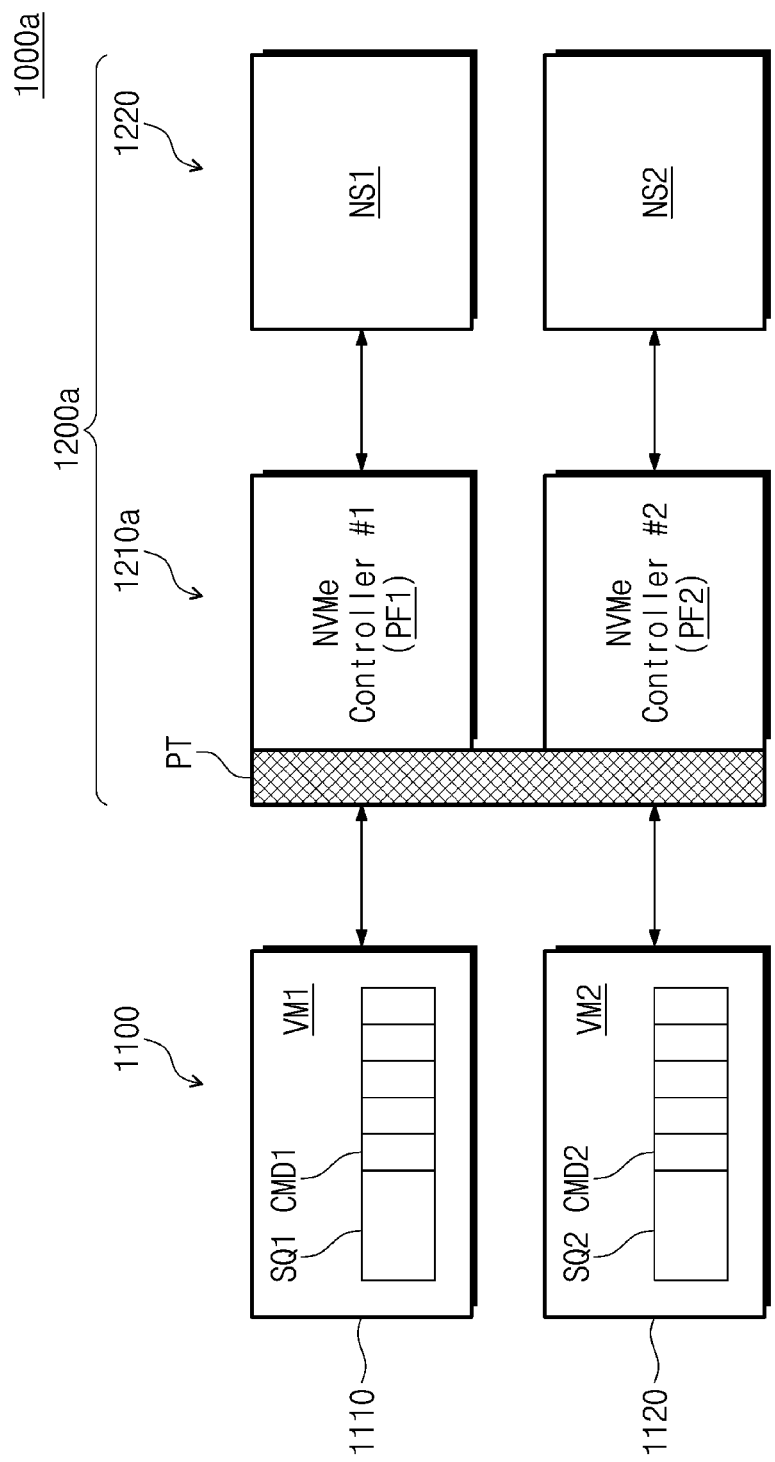
FIGS. 15A to 15C are block diagrams illustrating various topologies of a storage system.
Figure 15B:
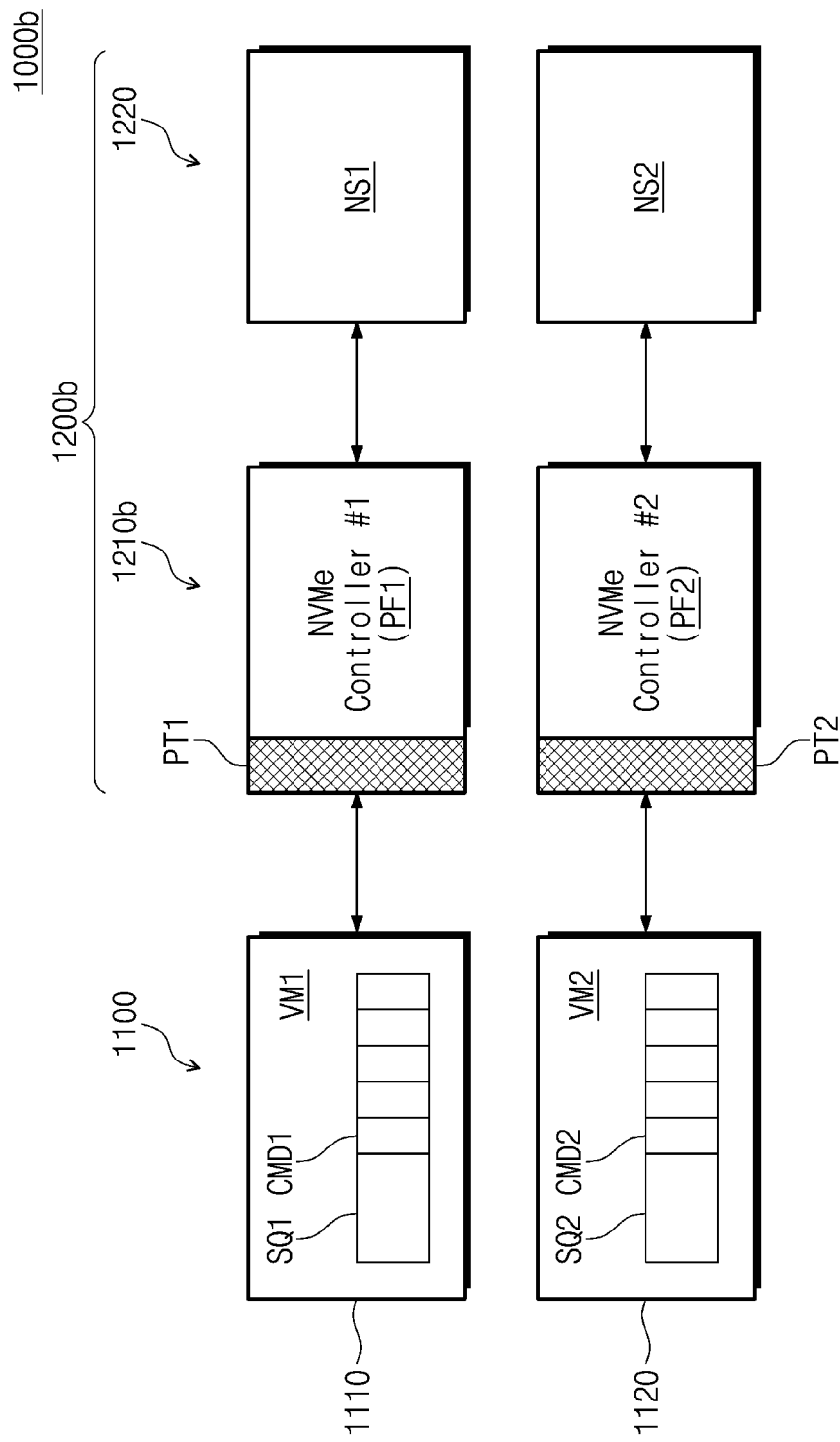
Figure 15C:
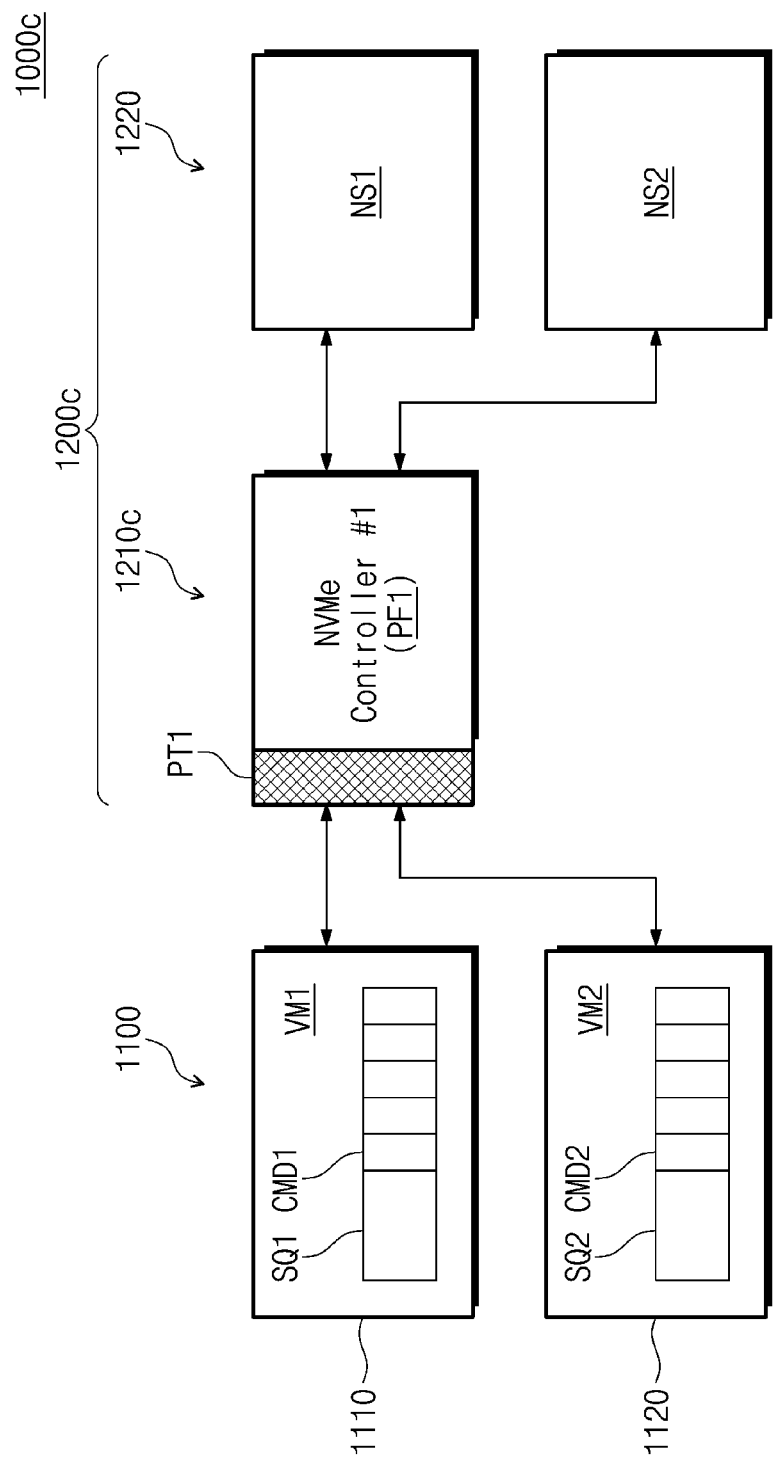

FIGS. 15A to 15C are block diagrams illustrating various topologies of a storage system. Below, the term "physical function PF" is used to describe the inventive concepts of the example embodiments easily. The physical function PF may refer to an NVMe controller corresponding to each, or one or more, of a plurality of host devices 1110 and/or 1120. The NVMe controller may be implemented in the form of software, hardware, or a combination thereof. Alternatively, the physical function PF may indicate a PCI-express function configured to support the SR-IOV function. The SR-IOV may indicate a function that allows one physical function to support one or more dependent virtualization functions. That is, below, it may be understood that the physical function PF corresponds to at least one of the plurality of host devices 1110 and/or 1120 and is configured to process a command of the corresponding host device of the plurality of host devices 1110 and/or 1120 or a command of a submission queue managed by the corresponding host device.

For convenience of description, below, it is assumed that the host device 1100 includes the first and/or second host devices 1110 and/or 1120, but the inventive concepts are not limited thereto. In some example embodiments, the first and/or second host devices 1110 and/or 1120 may be hardware devices that are physically distinguished from each other. Alternatively, the first and/or second host devices 1110 and/or 1120 may be the virtual machines VM1 and/or VM2 that are implemented in the same computing system or server system.

Referring to FIGS. 15A to 15C, storage systems 1000a, 1000b, and/or 1000c may include the host devices 1100 and/or storage devices 1200a, 1200b, and/or 1200c. each, or one or more, of the first and/or second host devices 1110 and/or 1120 may respectively issue commands CMD1 and/or CMD2 for processing corresponding operations. For example, the first host device 1110 may issue the first command CMD1, and/or the first command CMD1 thus issued may be stored in a first submission queue SQL The second host 1120 may issue the second command CMD2, and/or the second command CMD2 thus issued may be stored in a second submission queue SQ2.

Some example embodiments where each, or one or more of the first and/or second host devices 1110 and/or 1120 manages one submission queue is illustrated, but the inventive concepts are not limited thereto. For example, each, or one or more, of the first and second host devices 1110 and/or 1120 may manage a plurality of submission queues. Alternatively, each, or one or more, of the first and/or second host devices 1110 and/or 1120 may further manage a completion queue configured to receive completions associated with the plurality of submission queues.

Alternatively, each, or one or more, of the first and/or second host devices 1110 and/or 1120 may issue an administrative command and may further manage an admin queue and/or an admin completion queue that are configured to receive a completion associated with the administrative command. In some example embodiments, the submission queue, the completion queue, the admin queue, the admin completion queue, etc. may be included in a controller memory buffer (CMB) of a storage device. Alternatively, the submission queue, the completion queue, the admin queue, the admin completion queue, etc. may be included in a host device memory buffer (HMB) of a corresponding host device.

The storage devices 1200a, 1200b, and/or 1200c may communicate with the first and/or second host devices 1110 and/or 1120. In some example embodiments, the storage devices 1200a, 1200b, and/or 1200c may communicate with the first and/or second host devices 1110 and/or 1120 through an interface (e.g., NVMe over PCI-express) belonging to a physical layer that is based on a PCI-express interface. Alternatively, the storage devices 1200a, 1200b, and/or 1200c may communicate with the first and/or second host devices 1110 and/or 1120 through a network-based interface (e.g., NVMe-oF (NVMe over Fabrics)) such as a fibre channel or a remote direct random access memory (RDMA). Below, to describe some example embodiments of the inventive concepts clearly, it is assumed that storage controllers 1210a, 1210b, and/or 1210c communicate with the first and/or second host devices 1110 and/or 1120 through the NVMe over PCI-express interface.

The storage devices 1200a, 1200b, and/or 1200c may communicate with the first and/or second host devices 1110 and/or 1120 through various types of physical layers. First and/or second physical functions PF1 and/or PF2 may respectively correspond to the first and/or second host devices 1110 and/or 1120. For example, the first physical function PF1 may indicate a first NVMe controller configured to communicate with the first host device 1110 and to process the first command CMD1 from the first host device 1110. The second physical function PF2 may indicate a second NVMe controller configured to communicate with the second host device 1120 and to process the second command CMD2 from the second host device 1120.

Each, or one or more, of the first and/or second physical functions PF1 and/or PF2 may perform an operation for a nonvolatile memory device 1220 based on the command from the corresponding host device. In some example embodiments, the nonvolatile memory device 1220 may be managed by using a logically divided namespace NS or a physically or logically divided nonvolatile memory (NVM) set. Each, or one or more, of the first and/or second physical functions PF1 and/or PF2 may perform the operation corresponding to the command with respect to the corresponding namespace NS1 or NS2 or the corresponding NVM set.

In some example embodiments, as illustrated in FIG. 15A, the first and/or second physical functions PF1 and/or PF2 included in the storage controller 1210a may communicate with the first and/or second host devices 1110 and/or 1120 through one physical port PT. The physical port PT may be a physical layer configured to support the PCI-express interface. In some example embodiments, each, or one or more, of the first and/or second physical functions PF1 and/or PF2 may refer to a dependent virtual function or may support the dependent virtual function.

Alternatively, as illustrated in FIG. 15B, the first and/or second physical functions PF1 and/or PF2 included in the storage controller 1210b may communicate with the first and/or second host devices 1110 and/or 1120 through a plurality of physical ports PT1 and/or PT2. Each, or one or more, of the first and/or second physical ports PT1 and/or PT2 may be an independent physical layer configured to support the PCI-express interface. The first physical function PF1 may communicate with the first host device 1110 through the first physical port PT1, and the second physical function PF2 may communicate with the second host device 1120 through the second physical port PT2.

In some example embodiments, as illustrated in FIG. 15C, the first and/or second host devices 1110 and/or 1120 may communicate with one physical function PF1 included in the storage controller 1210c. That is, the first and/or second host devices 1110 and/or 1120 may respectively access the first and/or second namespaces NS1 and/or NS2 through the one physical function PF1.

The configurations described with reference to FIGS. 15A to 15C are provided as an example, and the inventive concepts are not limited thereto. As described above, the physical function PF may indicate the NVMe controller corresponding to each, or one or more, of the plurality of host devices, and a plurality of physical functions PF may be configured to communicate with the corresponding host devices through one physical port or individual physical ports.

In some example embodiments, the migration operation according to some example embodiments of the inventive concepts may be performed through the topologies described with reference to FIGS. 15A to 15C. For example, first data that are managed by the first host device 1110 may be stored in the first namespace NS1. In this case, the first data may migrate from the first namespace NS1 to the second namespace NS2 through the live migration (in particular, the transfer of dirty information with the variable granularity) according to some example embodiments of the inventive concepts.

Figure 16:
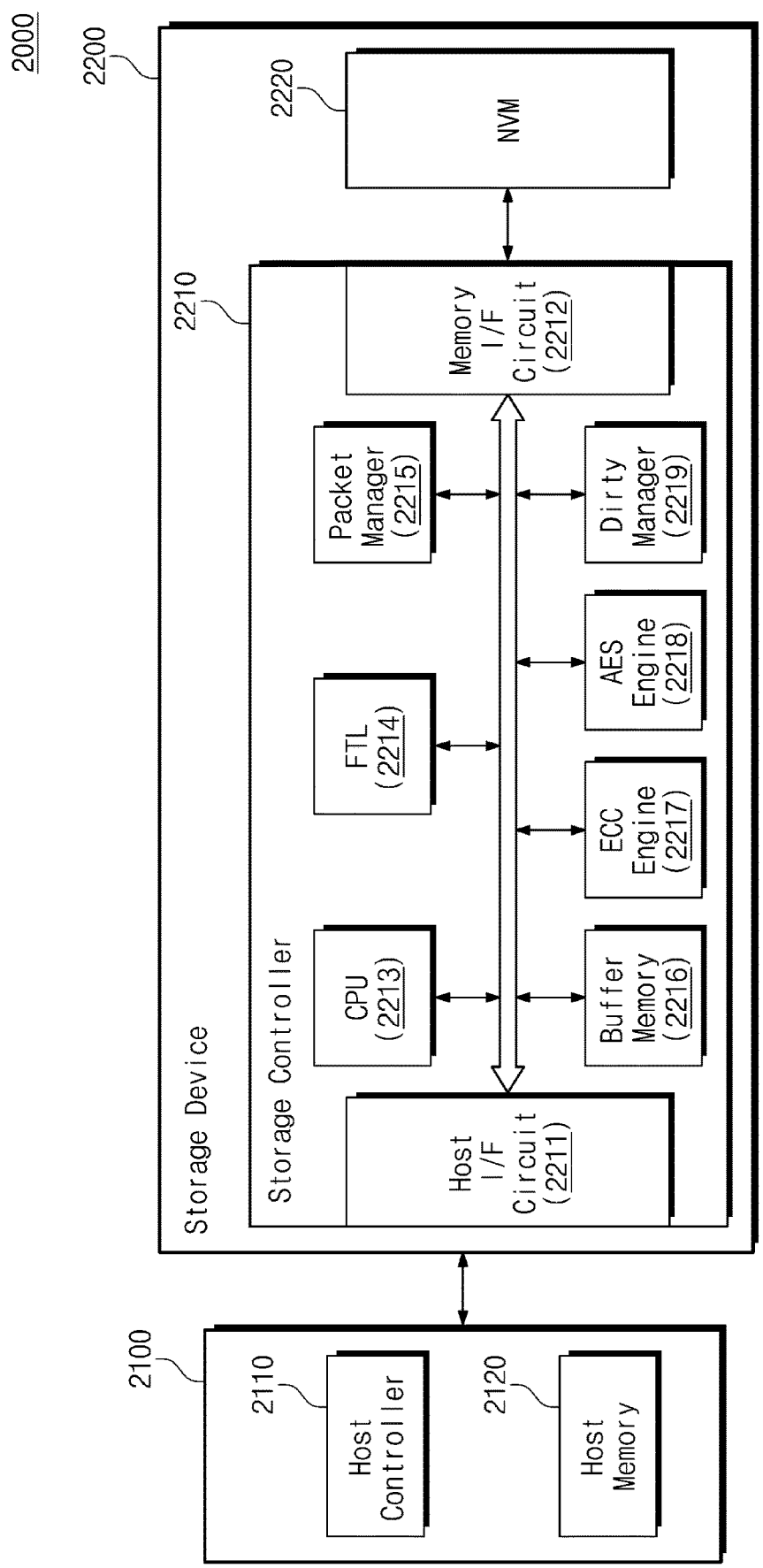
FIG. 16 is a block diagram illustrating a host device-storage system according to some example embodiments of the inventive concepts.

FIG. 16 is a block diagram of a host storage system according to some example embodiments.

The host storage system 2000 may include a host 2100 and/or a storage device 200. Further, the storage device 2200 may include a storage controller 2210 and/or an NVM 220. According to some example embodiments, the host 2100 may include a host controller 2110 and/or a host memory 120. The host memory 2120 may serve as a buffer memory configured to temporarily store data to be transmitted to the storage device 2200 or data received from the storage device 200.

The storage device 2200 may include storage media configured to store data in response to requests from the host 2100. As an example, the storage device 2200 may include at least one of an SSD, an embedded memory, and/or a removable external memory. When the storage device 2200 is an SSD, the storage device 2200 may be a device that conforms to an NVMe standard. When the storage device 2200 is an embedded memory or an external memory, the storage device 2200 may be a device that conforms to a UFS standard or an eMMC standard. Each, or one or more, of the host 2100 and/or the storage device 2200 may generate a packet according to an adopted standard protocol and transmit the packet.

When the NVM 2220 of the storage device 2200 includes a flash memory, the flash memory may include a 2D NAND memory array or a 3D (or vertical) NAND (VNAND) memory array. As another example, the storage device 2200 may include various other kinds of NVMs. For example, the storage device 2200 may include magnetic RAM (MRAM), spin-transfer torque MRAM, conductive bridging RAM (CBRAM), ferroelectric RAM (FRAM), PRAM, RRAM, and/or various other kinds of memories.

According to some example embodiments, the host controller 2110 and/or the host memory 2120 may be implemented as separate semiconductor chips. Alternatively, in some example embodiments, the host controller 2110 and/or the host memory 2120 may be integrated in the same semiconductor chip. As an example, the host controller 2110 may be any one of a plurality of modules included in an application processor (AP). The AP may be implemented as a System on Chip (SoC). Further, the host memory 2120 may be an embedded memory included in the AP or an NVM or memory module located outside the AP.

The host controller 2110 may manage an operation of storing data (e.g., write data) of a buffer region of the host memory 2120 in the NVM 2220 or an operation of storing data (e.g., read data) of the NVM 2220 in the buffer region.

The storage controller 2210 may include a host interface 2211, a memory interface 2212, and/or a CPU 2213. Further, the storage controller 2210 may further include a flash translation layer (FTL) 2214, a packet manager 2215, a buffer memory 2216, an error correction code (ECC) engine 2217, and/or an advanced encryption standard (AES) engine 2218. The storage controller 2210 may further include a working memory (not shown) in which the FTL 2214 is loaded. The CPU 2213 may execute the FTL 2214 to control data write and read operations on the NVM 2220.

The host interface 2211 may transmit and receive packets to and from the host 2100. A packet transmitted from the host 2100 to the host interface 2211 may include a command or data to be written to the NVM 2220. A packet transmitted from the host interface 2211 to the host 2100 may include a response to the command or data read from the NVM 2220. The memory interface 2212 may transmit data to be written to the NVM 2220 to the NVM 2220 or receive data read from the NVM 2220. The memory interface 2212 may be configured to comply with a standard protocol, such as Toggle or open NAND flash interface (ONFI).

The FTL 2214 may perform various functions, such as an address mapping operation, a wear-leveling operation, and/or a garbage collection operation. The address mapping operation may be an operation of converting a logical address received from the host 2100 into a physical address used to actually store data in the NVM 2220. The wear-leveling operation may be a technique for reducing or preventing excessive deterioration of a specific block by allowing blocks of the NVM 2220 to be uniformly used. As an example, the wear-leveling operation may be implemented using a firmware technique that balances erase counts of physical blocks. The garbage collection operation may be a technique for ensuring usable capacity in the NVM 2220 by erasing an existing block after copying valid data of the existing block to a new block.

The packet manager 2215 may generate a packet according to a protocol of an interface, which consents to the host 2100, or parse various types of information from the packet received from the host 2100. In addition, the buffer memory 2216 may temporarily store data to be written to the NVM 2220 and/or data to be read from the NVM 2220. Although the buffer memory 2216 may be a component included in the storage controller 2210, the buffer memory 2216 may be outside the storage controller 2210.

The ECC engine 2217 may perform error detection and correction operations on read data read from the NVM 2220. More specifically, the ECC engine 2217 may generate parity bits for write data to be written to the NVM 2220, and the generated parity bits may be stored in the NVM 2220 together with write data. During the reading of data from the NVM 2220, the ECC engine 2217 may correct an error in the read data by using the parity bits read from the NVM 2220 along with the read data, and output error-corrected read data.

The AES engine 2218 may perform at least one of an encryption operation and/or a decryption operation on data input to the storage controller 2210 by using a symmetric-key algorithm.

In some example embodiments, the storage controller 2210 may further include a dirty manager 2219. The dirty manager 2219 may manage information (e.g., a bitmap and/or dirty information) about dirty data based on the method described with reference to FIGS. 1 to 14 and may provide the host device 2100 with the information about dirty data depending on a request of the host device 2100. The host device 2100 may perform various operations (e.g., the live migration operation) based on the information about dirty data.

Figure 17:
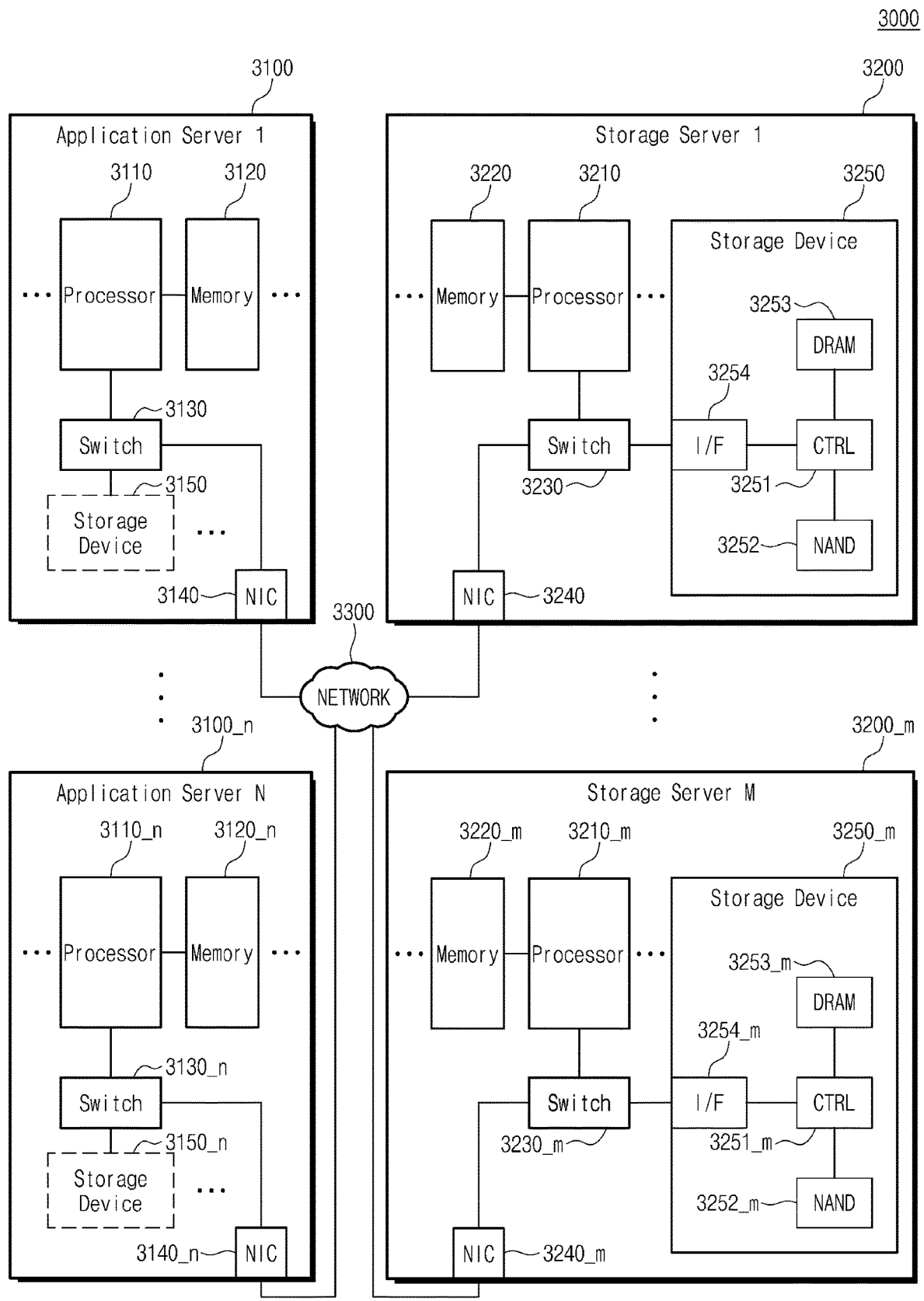
FIG. 17 is a diagram illustrating a data center to which a memory device according to some example embodiments of the inventive concepts is applied.

FIG. 17 is a diagram of a data center 3000 to which a memory device is applied, according to some example embodiments.

Referring to FIG. 17, the data center 3000 may be a facility that collects various types of pieces of data and provides services and be referred to as a data storage center. The data center 3000 may be a system for operating a search engine and/or a database, and may be a computing system used by companies, such as banks, and/or government agencies. The data center 3000 may include application servers 3100 to 3100*n* and/or storage servers 3200 to 3200*m*. The number of application servers 3100 to 3100*n* and/or the number of storage servers 3200 to 3200*m* may be variously selected according to some example embodiments. The number of application servers 3100 to 3100*n* may be different from the number of storage servers 3200 to 3200*m*.

The application server 3100 and/or the storage server 3200 may include at least one of processors 3110 and/or 3210 and/or memories 3120 and/or 3220. The storage server 3200 will now be described as an example. The processor 3210 may control all, or one or more, operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some example embodiments, the numbers of processors 3210 and/or memories 3220 included in the storage server 3200 may be variously selected. In some example embodiments, the processor 3210 and/or the memory 3220 may provide a processor-memory pair. In some example embodiments, the number of processors 3210 may be different from the number of memories 3220. The processor 3210 may include a single-core processor and/or a multi-core processor. The above description of the storage server 3200 may be similarly applied to the application server 3100. In some example embodiments, the application server 3100 may not include a storage device 3150. The storage server 3200 may include at least one storage device 3250. The number of storage devices 3250 included in the storage server 3200 may be variously selected according to some example embodiments.

The application servers 3100 to 3100*n* may communicate with the storage servers 3200 to 3200*m* through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200*m* may be provided as file storages, block storages, and/or object storages according to an access method of the network 3300.

In some example embodiments, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In some example embodiments, the network 3300 may be a general network, such as a TCP/IP network. For example, the network 3300 may be implemented according to a protocol, such as FC over Ethernet (FCoE), network attached storage (NAS), and/or NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be implemented as a web server and/or a database management system (DBMS). The application servers 3100 to 3100*n* may further include a switch 3130 to 3130*n* and/or a NIC (Network InterConnect) 3140 to 3140*n*. The switch 3130 may selectively connect the processor 3110 to the storage device 3150 or selectively connect the NIC 3140 to the storage device 3150 via the control of the processor 3110.

The application server 3100 may access a memory 3120*n* and/or a storage device 3150*n*, which is included in another application server 3100*n*, through the network 3300. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and/or the NIC(Network InterConnect) 3240. The switch 3230 may selectively connect the processor 3210 to the storage device 3250 or selectively connect the NIC 3240 to the storage device 3250 via the control of the processor 3210.

In some example embodiments, the NIC 3240 may include a network interface card and/or a network adaptor. The NIC 3240 may be connected to the network 3300 by a wired interface, a wireless interface, a Bluetooth interface, and/or an optical interface. The NIC 3240 may include an internal memory, a digital signal processor (DSP), and/or a host bus interface and be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230, and/or the storage device 3250.

In the storage servers 3200 to 3200*m* or the application servers 3100 to 3100*n*, a processor may transmit a command to storage devices 3150 to 3150*n* and/or 3250 to 3250*m* or the memories 3120 to 3120*n* and/or 3220 to 3220*m* and program or read data. In this case, the data may be data of which an error is corrected by an ECC engine. The data may be data on which a data bus inversion (DBI) operation and/or a data masking (DM) operation is performed, and may include cyclic redundancy code (CRC) information. The data may be data encrypted for security or privacy.

Storage devices 3150 to 3150*n* and/or 3250 to 3250*m* may transmit a control signal and/or a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all, or one or more, operations of the storage device 3250. In some example embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, and/or the processors 3110 and/or 3110n of the application servers 3100 and/or 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

In some example embodiments, data stored in a specific storage server (e.g., 3200) may migrate to the same storage server (e.g., 3200) or any other storage server (e.g., 3200m) based on the method (e.g., the method using dirty information with the variable granularity) described with reference to FIGS. 1 to 14.

As described above, according to some example embodiments of the inventive concepts, the storage system 100 iteratively performs migration on dirty data for the purpose of maintaining up-to-date dirty data in the live migration. In this case, the host device 110 receives a bitmap from the storage device 120 and determines dirty data based on the received bitmap. However, as the entire bitmap is transferred to the host device 110 every iteration operation, the latency increases. In contrast, according to some example embodiments of the inventive concepts, as the iteration operation is performed, the number of dirty data decreases; in this case, instead of sending the entire bitmap, dirty data with the variable granularity is provided from a storage device to a host device by using a characteristic that the bitmap is sparse. As such, a time taken to transfer dirty information may be shortened. This may mean that the overall performance of the storage system is improved. For example, according to some example embodiments, a live migration may be accomplished while transmitting less data between the host device and the storage device. Accordingly, processing performance of the host device may be improved during the live migration.

Some example embodiments of the inventive concepts are described above based on the live migration of the storage system 100, but the inventive concepts are not limited thereto. For example, in addition to the live migration, when the host device 110 checks dirty data associated with a specific region of the storage device 120, as described with reference to FIGS. 5 to 10, the dirty data may be checked through dirty information with the variable granularity.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to the inventive concepts, an operation method of a host device with improved performance and an operation method of a storage device are provided.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. An operation method of a host device configured to control a storage device, the method comprising:
receiving, by the host device, initial mapping information from the storage device;
performing initial migration based on the initial mapping information such that source data present in a first region of the storage device migrate to a second region;
receiving, by the host device, first dirty information about first dirty data of the source data from the storage device;
performing first migration on the first dirty data based on the first dirty information;
receiving, by the host device, second dirty information about second dirty data of the source data from the storage device; and
performing second migration on the second dirty data based on the second dirty information,
wherein a size of the first dirty information is different from a size of the second dirty information.

2. The method of claim 1, wherein the first dirty data are generated by an operation of the host device during the initial migration.

3. The method of claim 1, wherein the second dirty data are generated by an operation of the host device during the first migration.

4. The method of claim 1, wherein a time to receive the second dirty information from the storage device is shorter than a time to receive the first dirty information from the storage device.

5. The method of claim 1, wherein a time to perform the second migration is shorter than a time to perform the first migration.

6. The method of claim 1, wherein the receiving of the first dirty information includes:
receiving first sub-dirty information from the storage device;
generating first index information based on the first sub-dirty information; and
receiving second sub-dirty information from the storage device,
wherein the first dirty information includes the first sub-dirty information and the second sub-dirty information.

7. The method of claim 6, wherein the second sub-dirty information is based on the first index information.

8. The method of claim 6, wherein the first sub-dirty information has a first mapping unit, and the second sub-dirty information has a second mapping unit different from the first mapping unit, and
wherein the first mapping unit indicates a first size of the source data corresponding to each bit of the first sub-dirty information, and the second mapping unit indicates a second size of the source data corresponding to each bit of the second sub-dirty information.

9. The method of claim 8, wherein the first size is larger than the second size.

10. The method of claim 8, wherein the receiving of the first dirty information further includes:
determining the second mapping unit based on the first index information.

11. The method of claim 10,
wherein the second mapping unit is set to a minimum value in response to the first index information being greater than or equal to a reference value; and the second mapping unit is set to a given value in response to the first index information being less than the reference value.

12. The method of claim 1, further comprising:
in response to a number of the second dirty data being less than a threshold value,
   pausing an access to the first region;
   receiving third dirty information about third dirty data of the source data from the storage device; and
   performing third migration on the third dirty data based on the third dirty information.

13. The method of claim 12, further comprising:
accessing the second region with regard to the source data in response to the third migration being completed.

14. The method of claim 1, further comprising:
driving a first virtual machine and a second virtual machine,
wherein the first virtual machine is configured to access the first region, and the second virtual machine is configured to access the second region.

15. The method of claim 1, further comprising:
communicating with the storage device via a nonvolatile memory express (NVMe) interface.

16. An operation method of a storage device configured to operate under control of a host device, the method comprising:
   sending, by the storage device, initial mapping information about source data to the host device;
   performing initial migration under control of the host device such that the source data migrate from a first region to a second region;
   managing, by the storage device, information about first dirty data generated from the source data by using a first bitmap while sending the initial mapping information and performing the initial migration;
   generating, by the storage device, first dirty information based on the first bitmap and sending the first dirty information to the host device;
   performing first migration on the first dirty data under control of the host device;
   managing information about second dirty data generated from the source data by using a second bitmap while generating the first dirty information, sending the first dirty information, and performing the first migration;
   generating, by the storage device, second dirty information based on the second bitmap and sending the second dirty information to the host device; and
   performing second migration on the second dirty data under control of the host device,
   wherein a size of the first dirty information is different from a size of the second dirty information.

17. The method of claim 16, wherein the generating the first dirty information includes:
   receiving a first query request including information about a first mapping unit from the host device;
   generating first sub-dirty information based on the first bitmap in response to the first query request, each bit of the first sub-dirty information having the first mapping unit;
   sending the first sub-dirty information to the host device;
   receiving a second query request including information about a second mapping unit and first index information from the host device;
   generating second sub-dirty information based on the first bitmap in response to the second query request, each bit of the second sub-dirty information having the second mapping unit; and
   sending bits of the second sub-dirty information, which correspond to the first index information, to the host device,
   wherein the first mapping unit indicates a first size corresponding to each of bits belonging to the first sub-dirty information from among bits of the source data,
   wherein the second mapping unit indicates a second size corresponding to each of bits belonging to the second sub-dirty information from among the bits of the source data, and
   wherein the first size is larger than the second size.

18. The method of claim 16, further comprising:
   obtaining the first dirty information by compressing the first bitmap, and
   obtaining the second dirty information by compressing the second bitmap.

19. The method of claim 16, wherein the first dirty information includes first bitmap addresses indicating locations of bits of the first bitmap, the first bitmap addresses being selectively marked with respect to the first dirty data, and
   wherein the second dirty information includes second bitmap addresses indicating locations of bits of the second bitmap, the second bitmap addresses being selectively marked with respect to the second dirty data.

20. An operation method of a host device configured to control a storage device, the method comprising:
   receiving initial mapping information from the storage device;
   performing initial migration based on the initial mapping information such that source data present in a first region of the storage device migrate to a second region;
   performing first migration on first dirty data of the source data, based on a first bitmap associated with the first dirty data of the source data;
   performing a second migration based on a second bitmap associated with second dirty data of the source data in response to a number of the first dirty data being more than a reference value; and
   performing the second migration based on second dirty information based on the second bitmap in response to the number of the first dirty data being less than the reference value,
   wherein a size of the first bitmap is equal to a size of the second bitmap, and
   wherein a size of the second dirty information is smaller than each of the size of the first bitmap and the size of the second bitmap.

* * * * *